(12) United States Patent
Walsh, III

(10) Patent No.: US 11,143,768 B2
(45) Date of Patent: Oct. 12, 2021

(54) REAL TIME INDUCED SEISMICITY MANAGEMENT

(71) Applicant: Decision Geomechanics, LLC, Houston, TX (US)

(72) Inventor: Frederick Rall Walsh, III, San Francisco, CA (US)

(73) Assignee: Decision Geomechanics, LLC, Houston, TX (US)

(*) Notice: Subject to any disclaimer, the term of this patent is extended or adjusted under 35 U.S.C. 154(b) by 290 days.

(21) Appl. No.: 16/179,765

(22) Filed: Nov. 2, 2018

(65) Prior Publication Data

US 2019/0137639 A1    May 9, 2019

Related U.S. Application Data

(60) Provisional application No. 62/581,268, filed on Nov. 3, 2017.

(51) Int. Cl.
*G01V 1/00* (2006.01)
*G06N 7/00* (2006.01)

(52) U.S. Cl.
CPC .......... *G01V 1/008* (2013.01); *G06N 7/005* (2013.01); *G01V 2210/1232* (2013.01); *G01V 2210/1234* (2013.01); *G01V 2210/665* (2013.01)

(58) Field of Classification Search
CPC .. G01V 1/008; G01V 1/00; G01V 2210/1234; G01V 2210/123;

(Continued)

(56) References Cited

U.S. PATENT DOCUMENTS

| | | | |
|---|---|---|---|
| 10,810,331 B2* | 10/2020 | Umholtz | G06F 17/11 |
| 2012/0160481 A1* | 6/2012 | Williams | G01V 1/302 |
| | | | 166/250.01 |

(Continued)

OTHER PUBLICATIONS

Dinske et al., "Seismotectonic state of reservoirs inferred from magnitude distributions of fluid-induced seismicity", Mar. 22, 2012, Springer Science+ Business Media B.V. 2012, pp. 13-25. (Year: 2012).*

(Continued)

*Primary Examiner* — Mohamed Charioui
(74) *Attorney, Agent, or Firm* — Wolf, Greenfield & Sacks, P.C.

(57) ABSTRACT

The techniques described herein relate to methods, apparatus, and computer readable media for real-time induced seismicity management. A distribution value, such as a b value, and an uncertainty of the distribution value is calculated based on the received magnitude data, wherein the distribution represents the proportion of each magnitude earthquake observed in the distribution. A seismogenic index is calculated based on a set of fluid injection rates and the distribution value, wherein the seismogenic index represents the proportion of earthquakes per volume of fluid injected into the earth at a particular location. A distribution of a number of earthquakes that will be induced of each magnitude from future injection is forecasted based on the seismogenic index. A ground motion prediction model is calculated, representing shaking intensity and distance based on the forecasted distribution of earthquakes. Seismicity can then be managed to not exceed a tolerated chance of induced shaking consequences.

13 Claims, 21 Drawing Sheets

(58) Field of Classification Search
CPC ........... G01V 2210/12; G01V 2210/10; G01V 2210/00; G01V 2210/1232; G01V 2210/665; G01V 2210/66; G01V 2210/60; G06N 7/005; G06N 7/00
See application file for complete search history.

(56) References Cited

U.S. PATENT DOCUMENTS

| | | | | |
|---|---|---|---|---|
| 2014/0025593 A1* | 1/2014 | Dolin | ............... | G06Q 90/00 705/317 |
| 2014/0188447 A1* | 7/2014 | Venkataraman | ..... | G01V 99/005 703/2 |
| 2017/0169534 A1* | 6/2017 | Wani | ................. | G06Q 30/0283 |

OTHER PUBLICATIONS

Akkar et al., "Empirical ground-motion models for point- and extended-source crustal earthquake scenarios in Europe and the Middle East", May 31, 2013, Springer Science+ Business Media Dordrecht 2013, pp. 359-387. (Year: 2013).*

Shapiro et al., "Seismogenic index and magnitude probability of earthquakes induced during reservoir fluid stimulations", Mar. 2010, The leading Edge, pp. 936-940. (Year: 2010).*

[No Author Listed], Potential Injection-Induced Seismicity Associated with Oil & Gas Development: A Primer on Technical and Regulatory Considerations Informing Risk Management and Mitigation. Ground Water Protection Council and Interstate Oil and Gas Compact Commission. 2017. Second Edition. 181 pages.

Atkinson, Ground-Motion Prediction Equation for Small-to-Moderate Events at Short Hypocentral Distances, with Application to Induced-Seismicity Hazards. Bulletin of the Seismological Society of America. Apr. 1, 2015;105(2A):981-92.

Petersen et al., Seismic-hazard forecast for 2016 including induced and natural earthquakes in the central and eastern United States. Seismological Research Letters. Nov. 1, 2016;87(6):1327-41. doi: 10.1785/0220160072.

Van Der Elst et al., Induced Earthquake Magnitudes are as Large as (Statistically) Expected. Journal of Geophysical Research: Solid Earth. Jun. 2016;121(6):4575-90. doi:10.1002/2016JB012818.

Worden et al., Probabilistic Relationships between Ground-Motion Parameters and Modified Mercalli Intensity in California. Bulletin of the Seismological Society of America. Feb. 2012;102(1):204-21. doi: 10.1785/0120110156.

* cited by examiner

REAL TIME INDUCED SEISMICITY MANAGEMENT

RELATED APPLICATIONS

This application claims priority under 35 U.S.C. § 119(e) to U.S. Provisional Application Ser. No. 62/581,268 titled "REAL TIME INDUCED SEISMICITY MANAGEMENT," filed Nov. 3, 2017, which is herein incorporated by reference in its entirety.

TECHNICAL FIELD

The present techniques relate to the probabilistic management of the seismic consequences of fluid injection into the earth, and in particular to induced seismic hazard management based on Bayesian inference, the seismogenic index, ground motion prediction models, and/or some combination thereof.

BACKGROUND

Earthquakes can occur during or after injection of fluids into the subsurface of the earth during wastewater disposal, hydraulic fracturing, geothermal production, mining and other activities. In general, such "induced seismicity" poses little risk to the public. However, in rare cases it can result in adverse consequences such as regulatory action or ground shaking affecting infrastructure and the public. Methods for quantitively forecasting these consequences are useful because they inform decisions, allowing mitigation of risk.

Injection-induced seismicity is a complex topic; the technical literature has been summarized, for example, in part by the National Research Council and published in the National Research Council (2013) Induced Seismicity Potential in Energy Technologies, Washington, D.C.: *The National Academies Press*, available at https://doi.org/10.17226/13355, which is hereby incorporated by reference herein in its entirety. A second edition was published by the Ground Water Protection Council and Interstate Oil and Gas Compact Commission, Potential
Injection-Induced Seismicity Associated with Oil & Gas Development: A Primer on Technical and Regulatory Considerations Informing Risk Management and Mitigation, Second Edition, 2017, 181 pages, which is also hereby incorporated by reference herein in its entirety.

Induced Seismic hazards and associated risks are often managed using earthquake magnitude-based "traffic light" protocols (as shown in FIG. 1). These protocols use the colors of a traffic light to represent different operational statuses, which are typically associated with certain requirements for pausing, altering, stopping operations or communicating among various parties. For example, under current regulation in some frameworks, observation of an earthquake above Magnitude 2.5 during hydraulic fracturing operations results in a "yellow light" status, an earthquake above Magnitude 3 results in an "orange light" status, and an earthquake larger than magnitude 3.5 results in a "red light" status, which requires operations to be stopped.

Regulatory bodies have instituted similar regulations for hydraulic fracturing, and some companies have similar internal protocols. Under these protocols, earthquakes exceeding pre-determined magnitude criteria result in changes in permit status, which can lead to action including shutting down wells or limiting injection. Traffic light or similar protocols have resulted in water disposal, geothermal, and hydraulic fracturing wells being shut down because of observed earthquakes. Changes in operator requirements and permit conditions are generally based on the occurrence of intermediate (yellow) magnitude events being predictive of larger (red) magnitudes.

SUMMARY OF THE INVENTION

In some non-limiting embodiments of the present techniques, the probability of inducing felt ground shaking is calculated over a range of fluid injection volumes. The volume to be injected can be chosen to not exceed a tolerated probability.

In some non-limiting embodiments of the present techniques, a planned injection volume is altered to avoid exceeding a tolerated probability of an adverse event, such as an earthquake that exceeds a given magnitude, an earthquake that can be felt at the Earth's surface, or an earthquake that can be felt by more than a certain number of people.

In some non-limiting embodiments of the present techniques, a computerized method of processing earthquake magnitude and fluid injection data includes receiving data indicative of earthquake magnitudes and a set of fluid injection rates; calculating a magnitude distribution value and an uncertainty of the distribution value based on the received earthquake data, wherein the distribution value represents a proportion of each magnitude earthquake observed; calculating a seismogenic index based on an injected volume from the set of fluid injection rates, the distribution value, an earthquake count from the received earthquake data, or some combination thereof, wherein the seismogenic index represents a number of earthquakes per volume of fluid injected into the earth at a particular location; generating a distribution value expectation based on previously determined seismicity, wherein the distribution value represents a distribution of values that may be observed for the previously determined seismicity; generating, based on the distribution value, Bayes theorem, or both, an expected distribution of future earthquake magnitude observations; and forecasting a number of earthquakes that will be induced of each magnitude, based on the seismogenic index, the expected distribution of future earthquake observations, or both.

In some non-limiting embodiments of the present techniques, a computerized method of processing earthquake magnitude and fluid injection data includes calculating a distribution value and an uncertainty of the distribution value based on the received magnitude data, wherein the distribution represents the proportion of each magnitude earthquake observed; calculating a seismogenic index based on a set of fluid injection rates and the distribution value, wherein the seismogenic index represents the number of earthquakes per volume of fluid injected into the earth at a particular location; forecasting, based on the seismogenic index, a distribution of a number of earthquakes that will be induced of each magnitude from future injection; and calculating a ground motion prediction model representing shaking intensity and distance based on the forecasted distribution of earthquakes.

In some non-limiting embodiments of the present techniques, a method of processing earthquake magnitude and fluid injection data includes: (1) receiving, from computers or users, data indicative of earthquake magnitudes and fluid injection rates; (2) calculating a Gutenburg-Richter b value and its uncertainty based on the received earthquake data; (3) calculating a seismogenic index based on an injected volume and the Gutenburg-Richter b value and earthquake count; (4) generating a b value expectation; (5) using the observed b value or applying Bayes theorem to generate an expected distribution of future b observations or just using the b expectation to forecast; and (6) forecasting induced event population, based on the seismogenic index, a distribution of earthquakes from future injection and an expectation of b value; (7) Potential consequences of this distribution of earthquakes.

In some non-limiting embodiments of the present techniques, a method of processing earthquake magnitude and fluid injection data includes: (1) calculating a Gutenburg-Richter b value and its uncertainty based on the received magnitude data; (2) calculating a seismogenic index based on an injected volume and the Gutenburg-Richter b value; (3) forecasting, based on the seismogenic index, a distribution of earthquakes from future injection and an expectation of b value; and (4) calculating a ground motion prediction equation or model of shaking intensity vs. distance informed or weighted by the forecasted distribution of earthquakes.

The techniques in any of the previous paragraphs in this section, including applying Bayes Theorem to uncertainty in the Gutenburg-Richter b value, or Gutenburg-Richter a value which is indicative of the number of events per time or per volume injected.

The techniques in any of the previous paragraphs in this section, including updating the forecast during fluid injection as new earthquake or injection information becomes available.

The techniques in any of the previous paragraphs in this section, including applying outputs to evaluate the chance of violating a traffic light based constraint such as an earthquake magnitude.

The techniques in any of the previous paragraphs in this section, including employing a fragility function, a probabilistic description of the sensitivity to shaking such as a mean felt ratio (which is the probabilistic fraction of people that would feel a particular ground motion), or both.

The techniques in any of the previous paragraphs in this section, including assigning a penalty value to a consequence such as a point, score or dollar amount.

The techniques in any of the previous paragraphs in this section, including executing a Probabilistic, Monte Carlo or Bootstrap process, and/or accounting for uncertainties in the locations of induced events, b values, expected number of events ground motions, felt sensitivities, probability of an event being a false detection, or uncertainties in other model inputs.

The techniques in any of the previous paragraphs in this section, including determining a decision to maximize injection within some tolerated probability-based seismicity constraint.

The techniques in any of the previous paragraphs in this section, including probabilistically weighting parts of a calculation or result using a logic tree.

The sale of analysis in any of the previous paragraphs in this section through a subscription or on a per event or per dataset basis.

The techniques in any of the previous paragraphs in this section, wherein calculating the distribution value comprises calculating a Gutenburg-Richter b value.

The techniques in any of the previous paragraphs in this section, wherein calculating the distribution value comprises calculating a Gutenburg-Richter a value and a Gutenburg-Richter b value; and the method further includes applying a Bayes Theorem to uncertainty in the Gutenburg-Richter b value, the Gutenburg-Richter a value, or both.

The techniques in any of the previous paragraphs in this section, including truncating the b value distribution.

The techniques in any of the previous paragraphs in this section, including receiving new earthquake data, fluid injection data, or both, generated during fluid injection; and updating the forecasted induced event population based on the new earthquake data, fluid injection data, or both.

The techniques in any of the previous paragraphs in this section, including applying the forecasted distribution to evaluate a chance of violating a traffic light based constraint, wherein the traffic light based constraint comprises an earthquake magnitude.

The techniques in any of the previous paragraphs in this section, including executing a fragility function representing a susceptibility of structures to damage by shaking; calculating, based on historical earthquake data, a probabilistic description representative of how people would perceive ground motion; or both.

The techniques in any of the previous paragraphs in this section, including assigning a penalty value to a consequence such as a point, score, dollar amount, or any combination thereof, to quantify a tolerance of an institution for inducing ground shaking.

The techniques in any of the previous paragraphs in this section, including executing a calculation to account for uncertainties in a model parameter; wherein: the calculation is selected from the group consisting of Probabilistic, Monte Carlo, Quantitative Risk Analysis, Sensitivity analysis, or a Bootstrap process; and the model parameter is selected from the group consisting of uncertainties in locations of future induced events, b values, a values, expected number of events, ground motion from events, felt sensitivities, and probability of an event being a false detection.

The techniques in any of the previous paragraphs in this section, further comprising determining a set of maximized injection parameters based on a forecast of seismicity, shaking, or both, to determine a tolerated amount of injection based on a probabilistic seismicity constraint.

The techniques in any of the previous paragraphs in this section, further comprising probabilistically weighting results of different models using a logic tree.

These and other capabilities of the disclosed subject matter will be more fully understood after a review of the following figures and detailed description. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
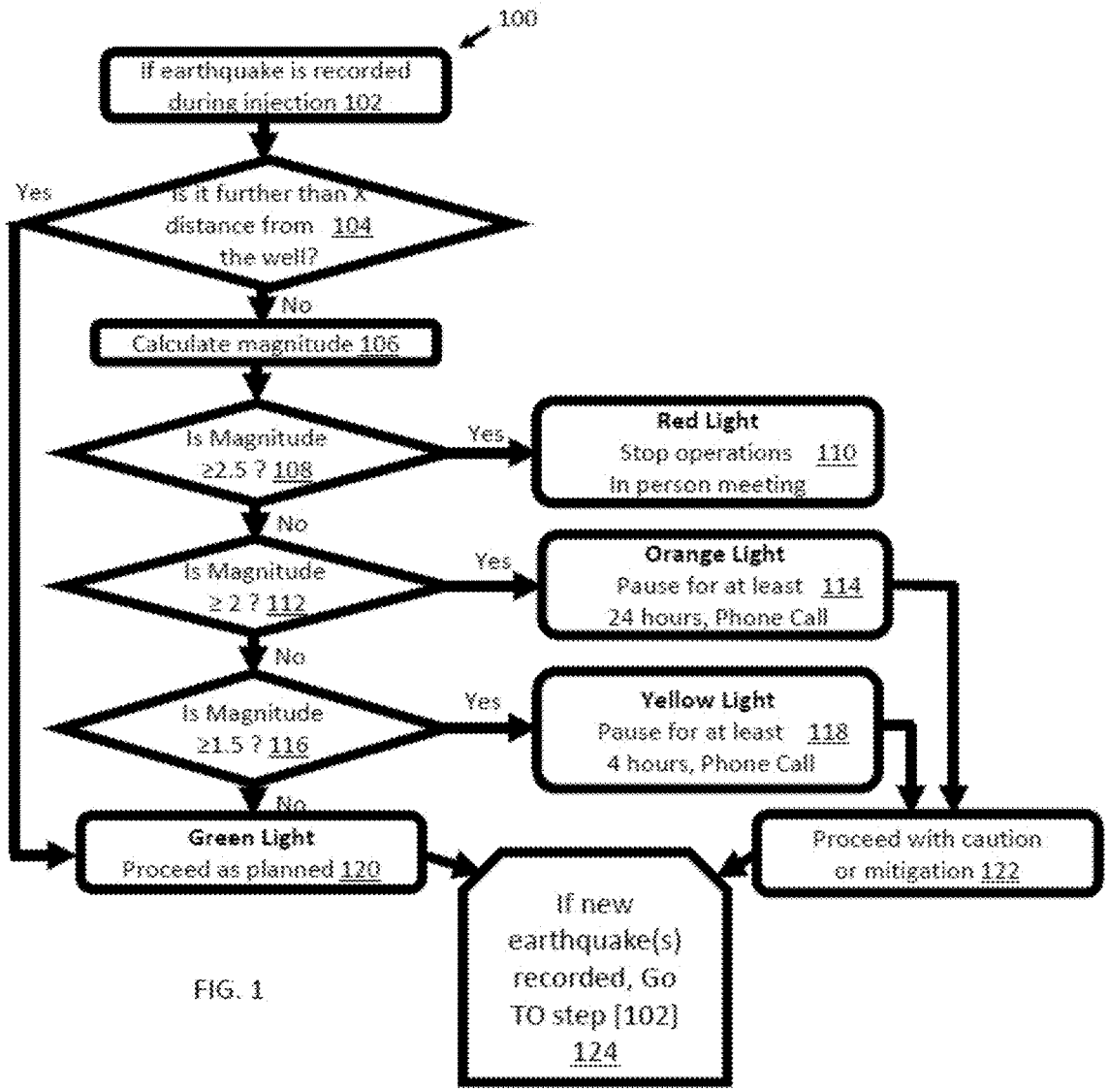
FIG. 1. Shows an example of a traffic light protocol as currently used by some institutions for managing induced earthquakes, according to some embodiments.

The inventor has recognized and appreciated that in order to improve the management of induced earthquakes, such as those caused during injection procedures including water disposal, hydraulic fracturing or geothermal stimulation, techniques can be used to determine the chance that an injected volume of fluid will induce measurable ground shaking for an earthquake of a given magnitude. In particular, techniques can be used to determine the maximum volume of fluid that has a tolerably low probability (as defined by a user) of inducing measurable or perceived ground shaking. As discussed herein, if the planned fluid injection causes the probability of an adverse event to exceed a predetermined threshold, the fluid injection volume can be altered to ensure that the injection profile and overall injection volume are associated with a tolerably low probability of a consequence (such as ground motion metrics or magnitudes exceeding a certain amount).

Such proactive techniques can result in significant savings in time, resources, and money and reduced liability by preemptively adjusting procedural parameters to reduce the likelihood of ground shaking and/or other side effects that violate regulations and/or results in other undesirable outcomes as defined by an operator. As discussed herein, the inventor has recognized and appreciated that various probabilistic techniques can be used to analyze earthquake data and determine acceptable tolerances, parameters, and related probabilities, which can then be applied to real-world procedures.

Many techniques can be used to probabilistically inform procedures. Here, some general examples are presented of which the given example is one specific instance:

(1) Various techniques can be used to determine the distribution of observed earthquake magnitudes. One technique calculates a Gutenburg-Richter b value that represents a distribution from which future earthquake magnitudes will be sampled; a person of skill will appreciate that other distributions or truncations may also be considered.

(2) A calculated seismogenic index or substantially similar parameter can be used to seismotectonically characterize the productivity of earthquakes induced by injection through time at an injection location. This allows for determination of a relationship between fluid injection parameters and resultant seismicity observed thus far. The seismogenic index relates cumulative injected volume to "a" value because they are related through injection pressure and statistical and mechanical behavior of a fracture network. The seismogenic index also assumes proportionality between events and volume exactly equal to one, but this proportionality could be treated as uncertain.

(3) Various statistical inference or statistical learning techniques or algorithms can be used to infer the expected distribution of future earthquakes as different from those observed previously, based on training or prior data. One example of this technique is the use of Bayes' theorem. Another is to just use the distribution already observed.

(4) Various methods of sampling distributions of expected future earthquakes can be used to determine values such as the probability of observing one or more event meeting or exceeding a given magnitude.

(5) Various ground motion prediction equations or models may be used, alone or in combination, such as the Atkinson 2015 model shown as an example by lines 1602 through 1610 and line 1702. Some models may be used only within certain magnitude and distance ranges or to predict certain metrics. Multiple models may also be combined using a logic tree such as that shown in FIG. 20.

(6) The event location may be treated in several ways, such as deterministically (below the well in the example) or using some probabilistic distribution of location and depth (as could be the case if using Monte Carlo analysis).

(7) Although Modified Mercalli Intensity bins of peak ground acceleration are presented herein, other binning techniques and ground motion metrics (such as Peak Ground Displacement and Peak Ground Velocity) can be used. These may partition ground motions into discrete bins or continuous functions with associated probability of consequence functions.

Figure 17:
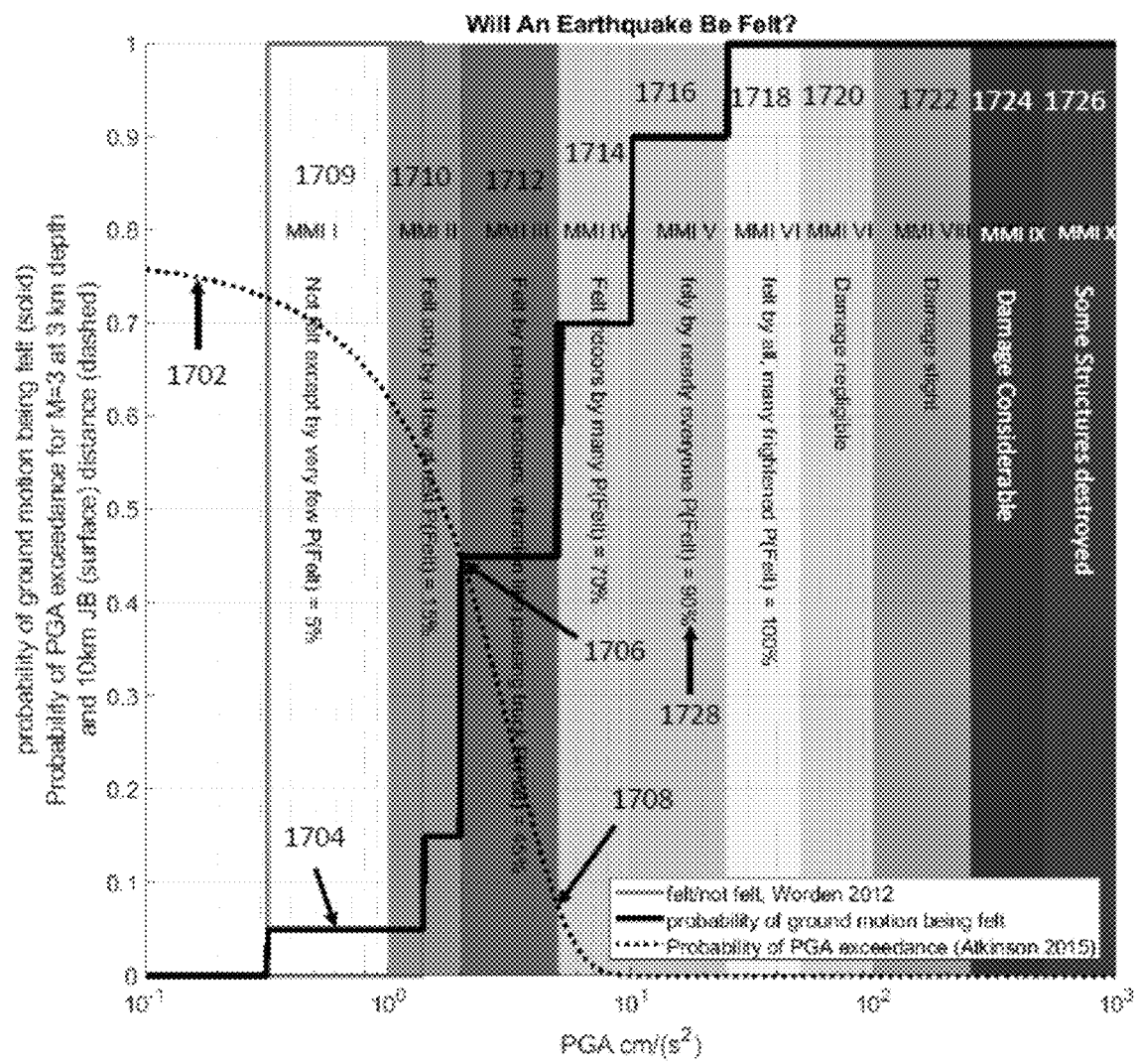
FIG. 17. Shows an example probability of PGA exceedance curve and a curve describing the probability of ground motion being felt in each respective Modified Mercalli category, according to some embodiments.

(8) The probability of feeling a peak ground acceleration can be estimated as in FIG. 17. Other probabilities may also be estimated, including mean loss ratios of buildings, fragility, and other ground motion vulnerability metrics.

These techniques can be used to forecast the impact of parameters related to the procedures and determine an optimal set of parameters to maintain the procedure within specified operating limits (e.g., below set earthquake magnitude thresholds to prevent stopping and/or shutting down the procedure). While the description that follows uses certain example techniques and variables, including Gutenburg-Richter b values, seismogenic indexes, and ground motion prediction models, these examples are used for illustrative purposes only and are not intended to be limiting. A person of skill will appreciate that other techniques and/or combinations of techniques can be used without departing from the spirit of the invention. For example, while the power law b value is used in the example, many other distributions could be used to the same end.

Induced earthquakes are often managed using traffic light protocols such as the one described by FIG. 1. When an earthquake is recorded 102, its location is compared to that of operating injection wells. If it is greater than a predetermined distance from all wells, the wells 120 remain under green light status and injection continues unaltered 120. If the earthquake is within the predetermined distance of one or more operating wells, its magnitude is calculated at 106. At 108, 112, 116, the earthquake magnitude is compared to a set of predetermined magnitude thresholds to determine whether or not red, orange, or yellow status should be triggered.

If the magnitude 106 is too small to trigger yellow light status 116, the well remains under green light status 120. If the red light is triggered, 110 injection must be stopped. If the orange or yellow light is triggered 114, 118, injection may be paused for reassessment and resumed, possibly with mitigation measures in place 122.

Traffic light systems are already implemented within some regulatory jurisdictions and commercial operations. Since tripping a traffic light often has negative consequences for the operator, it can be treated as a risk to be managed according to the protocol disclosed herein.

There are several problems associated with traffic light systems. One problem is that the magnitude of one earthquake is a poor predictor of the magnitude of the next. For example, in natural seismicity, models based on the assumption that foreshock magnitudes are predictive of future magnitudes were replaced long ago with Coulomb stress transfer geomechanical models, Omori decay type statistical models, and other classes. This is because it is more effective to treat the magnitudes of future events (natural or induced) as samples from some distribution. Traffic light systems may also neglect earthquake information that a b value does not. For example, while three magnitude X events are treated the same way as one magnitude X event under a traffic light system, they result in different outcomes when fitting a b value. Traffic light systems are also sensitive to magnitude rounding and magnitude errors or uncertainties. For example, a M 1.4 event might require no action, while a M 1.5 might require material action, though they are not dissimilar. Lastly, traffic lights may fail to take into account the amount of injection that has been undertaken relative to the amount that is planned in the future. As a result, two events of the same magnitude, one occurring after 10% of the operation, and one occurring after 90% of the operation, may have different implications when it comes to the risk associated with the remainder of the injection process.

Figure 21:
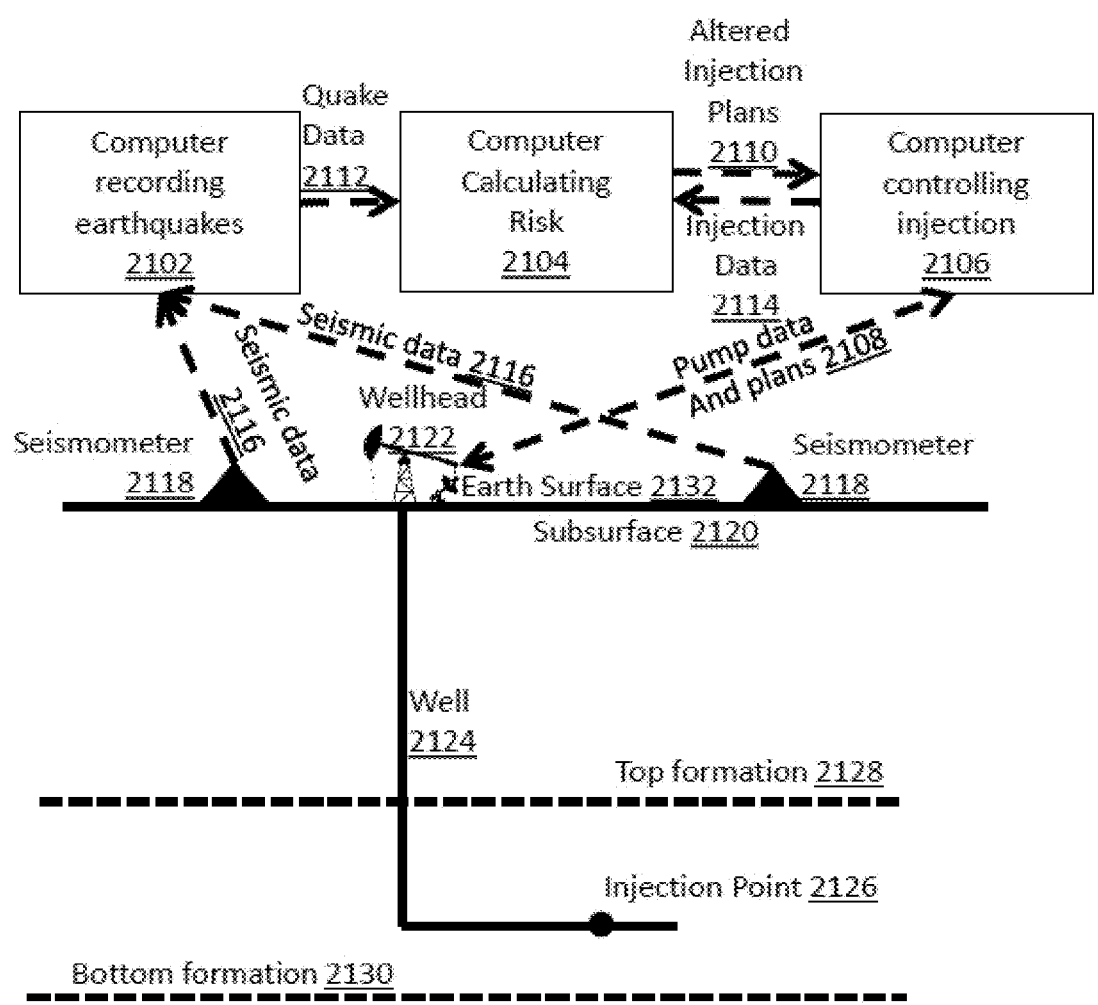
FIG. 21. Shows an example physical setup, according to some embodiments.

The techniques and protocols described herein allow for decision-making based on data collected from physical injection operations. An example setup of some of the physical elements of the techniques is shown in FIG. 21. In this setup, an injection or production well 2124 (which may be vertical or deviated) extends down into a target formation 2128-2130. Injection is generally accomplished by a pump 2122 at the surface 2132, which is controlled by a computer or gauge 2106. Earthquakes are recorded by seismometers or similar instruments 2118, and their magnitudes and other attributes are calculated by a computer using their waveforms 2102. Earthquake magnitudes and associated attributes, such as time stamp and location 2112, as well as fluid injection data, such as injection rate 2114, may be shared with the computer undertaking the risk-based calculations disclosed here 2104, which can result in altered fluid injection plans 2110, 2108. Note that the three distinct computations 2102, 2104, 2106 need not necessarily be done on different computers.

Figure 2:
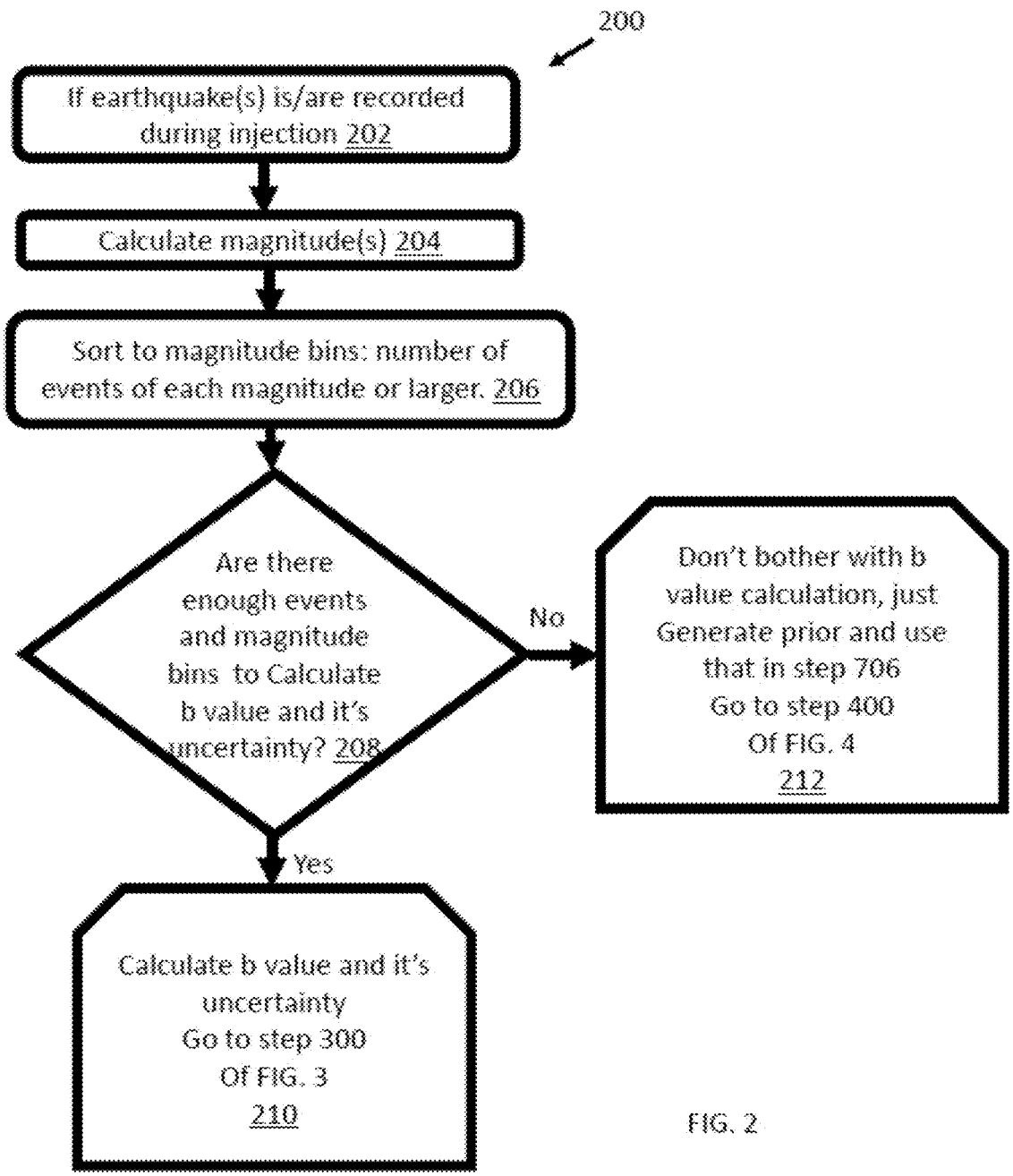
FIG. 2. Shows an example method of assessing earthquakes recorded partway through injection in order to decide if or how the b value distribution will be constrained, according to some embodiments.

FIG. 2 describes the first steps of the risk management protocol, which is carried out by the computer 2104 after one or more earthquakes have been recorded during injection 202. First, event magnitudes are calculated 204. This can be accomplished in a variety of ways: magnitudes are sometimes available from sources over the internet; alternatively, they can be calculated using data obtained via surface or downhole monitoring. Calculated magnitudes may be uncertain or vary between different networks and calculation methods. Once event magnitudes are determined, events can be sorted 206 to calculate the number of events of each magnitude or larger. The event bin counts are denoted by X marks 1102 in FIG. 11. Sometimes few events are recorded. In this case, at 208 the analysis may not be undertaken, or it may be undertaken under a variety of assumptions 212. One possible assumption is that a distribution of b values calculated from other wells or areas can be used to describe the local area 212. If there is enough information to calculate even an uncertain b value, 210, 1104, 1106 that calculation is done next 300.

Figure 3:
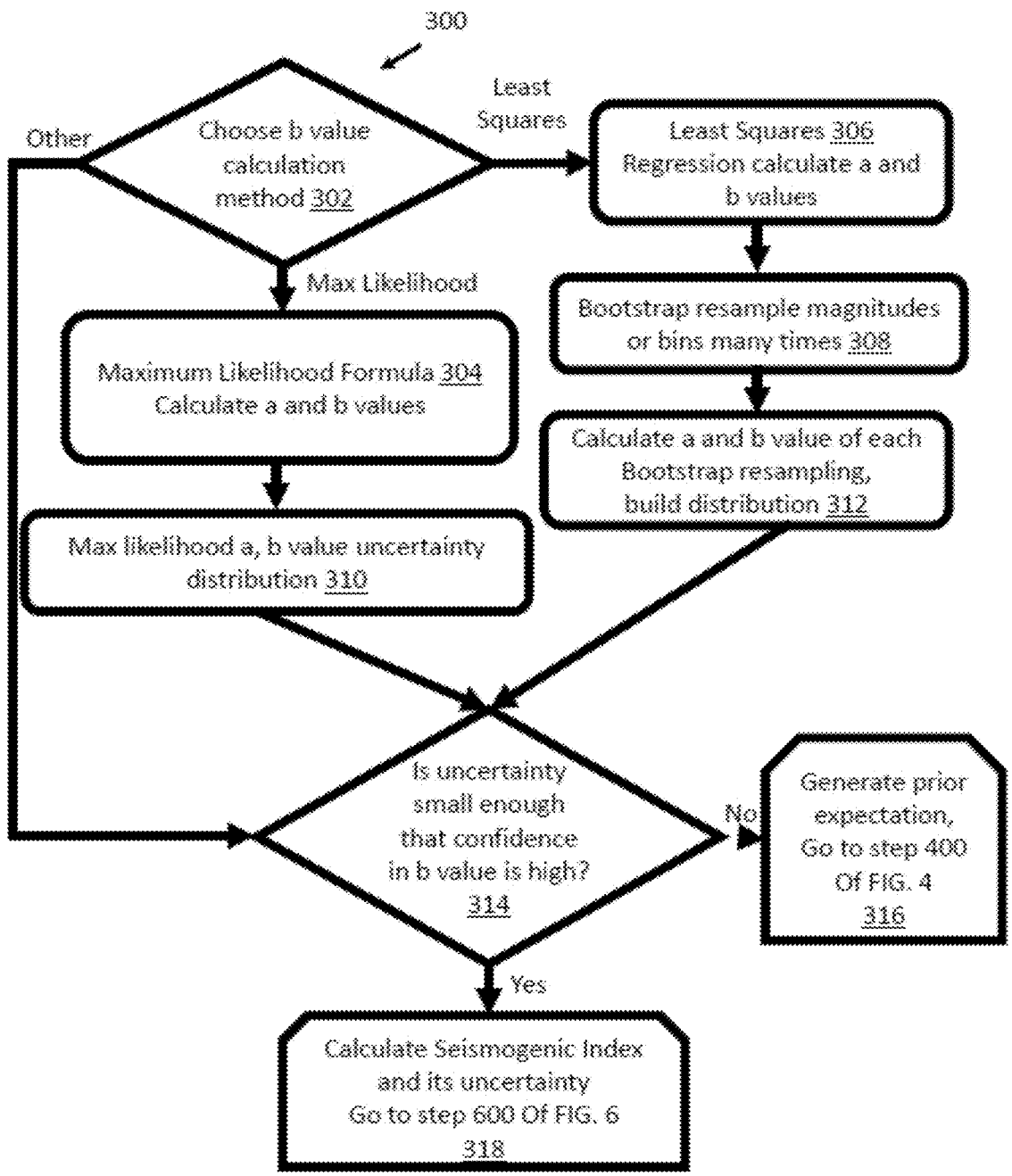
FIG. 3. Shows an example method of undertaking different b value calculations using uncertainty distributions constrained from earthquake data, according to some embodiments.
Figure 11:
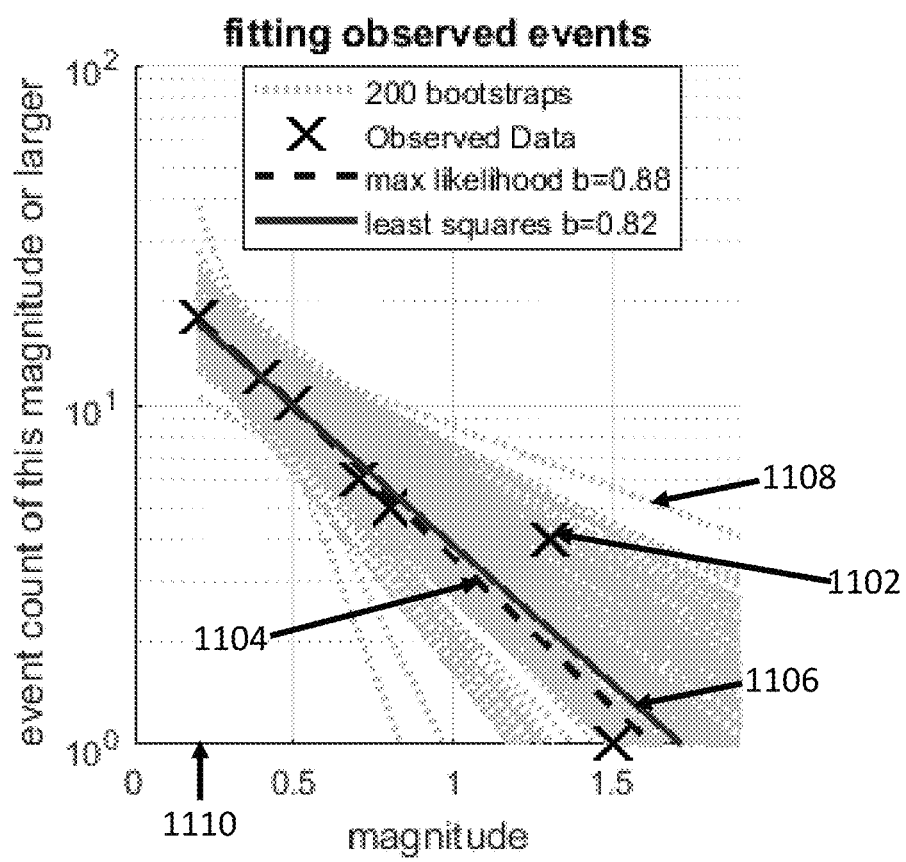
FIG. 11. Shows the results of two example a and b value calculations along with least squares fits of bootstrap resampled magnitude bins, according to some embodiments.

It is of value to know the proportion of small magnitude earthquakes to large magnitude earthquakes in a population. The Gutenburg-Richter relation 304, 306, 1104, 1106, is commonly used to describe the distribution of observed earthquake magnitudes, is an empirical description of earthquake frequency-magnitude scaling expressed as a power law. It is described mathematically as:

$$\log_{10}(N \geq M) = a - bM \quad \text{(EQ. 1)}$$

where $N \geq M$ is the number of events of magnitude M or larger and a and b are fitting coefficients. b represents the slope of the relationship on a log-linear plot FIG. 11 and a represents the vertical axis intercept, which is the log of the number of magnitude 0+ earthquakes in the distribution. FIG. 3 shows how the value of b, or a distribution of uncertain (error/residual/bootstrapped) b values, can be calculated by the maximum likelihood 304 method, the least squares 306 method, and other methods. Results obtained using the maximum likelihood and least squares methods are shown in FIG. 11 as lines 1104 and 1106. Uncertainty can be calculated analytically in the case of the Maximum Likelihood method 310, or using bootstrap or similar resampling methods 312. The example 1108 shows bootstrapping of the magnitudes.

The uncertainty is assessed in 314 to decide if confidence in the b value is high. In many cases, it will not be high because of the small number of events or range of magnitudes observed 316, but in some cases, it can be high 318. If confidence is high, the b value distribution will be used in step 706 as the b value distribution of future earthquakes. If uncertainty is large or confidence is low 316, Bayes' rule can be used 400 to generate an expected (posterior) distribution.

Figure 4:
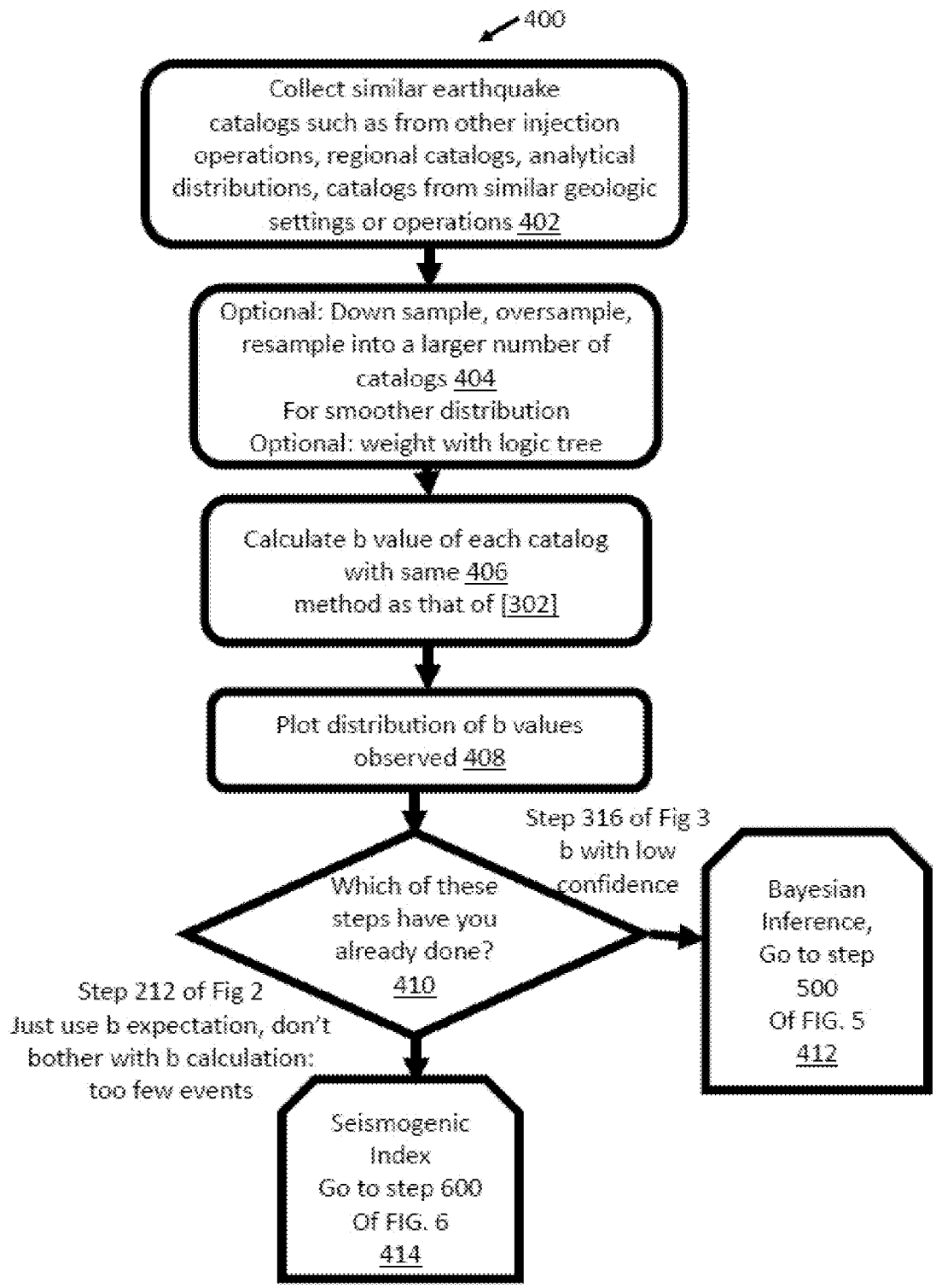
FIG. 4. Shows an example method of how a b value expectation distribution can be constrained. This can be used as the prior distribution for Bayesian inference, or as the distribution from which future earthquake magnitudes are sampled, according to some embodiments.
Figure 12A:
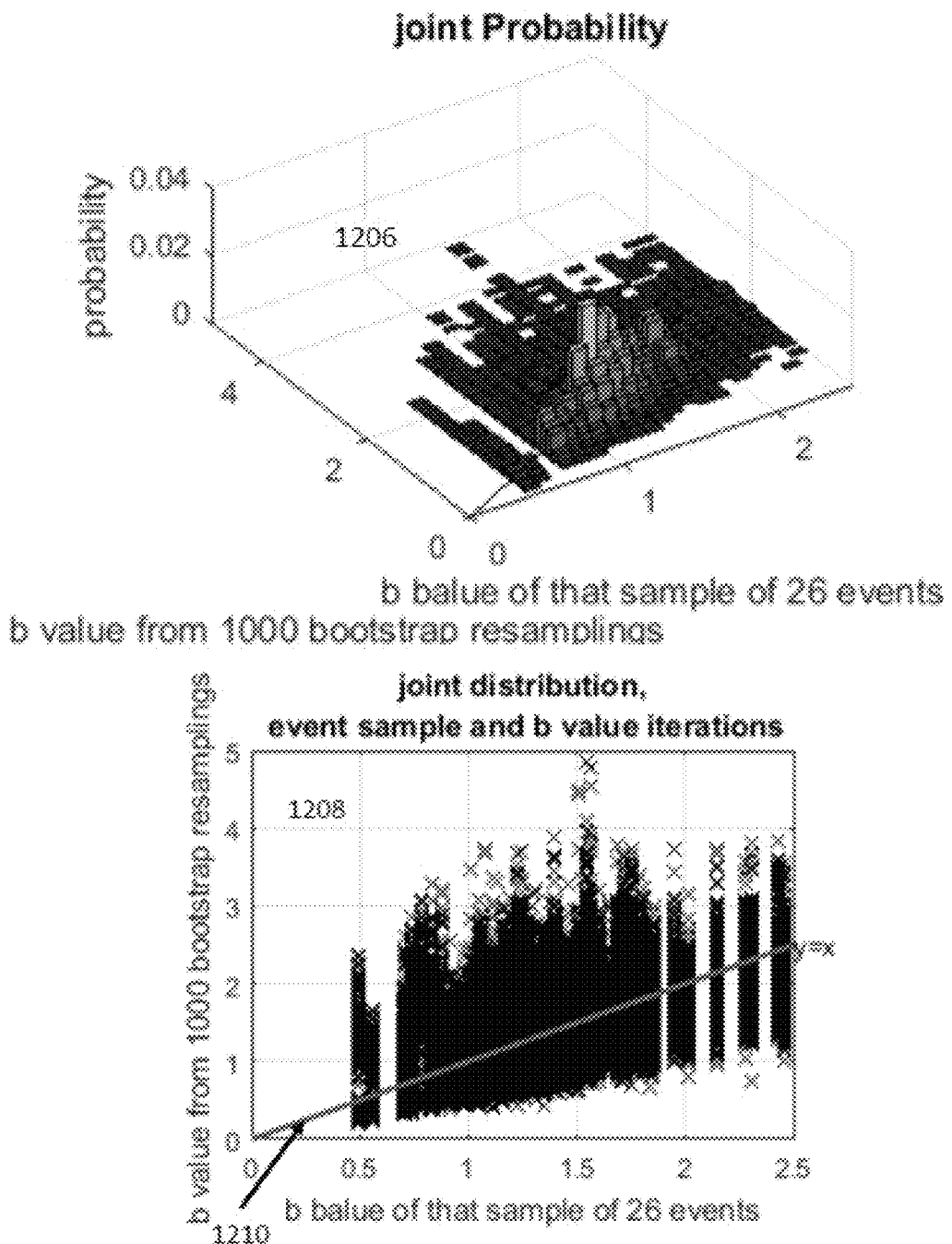
FIGS. 12A-12B. Show exemplary bivariate and marginal distributions relating to Bayesian inference.
Figure 12B:
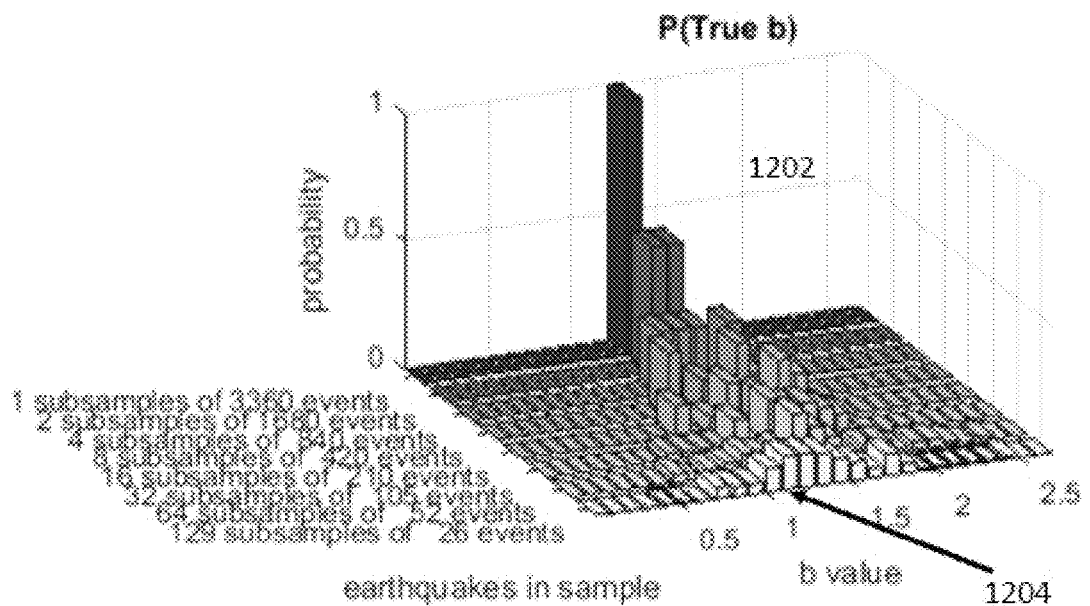
Figure 12B:
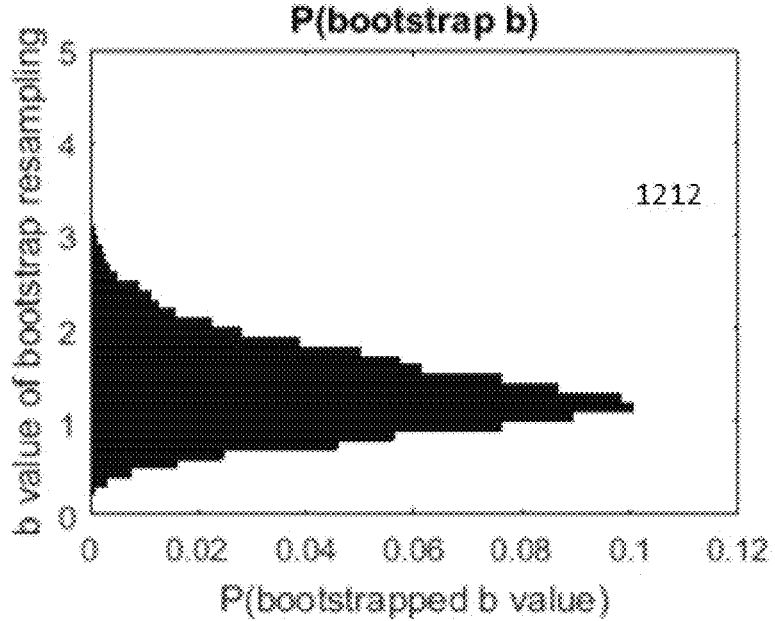

The first step of using Bayes' rule is to generate a prior expectation 400 against which the calculated b distribution 310 or 312 can be evaluated. FIG. 4. shows how a distribution of expected b values can be generated. First, one or more catalogs from nearby areas, similar injection sites, sites with similar operations and/or geologies, regional databases, or analytical distributions 402 are gathered. These catalogs can then be down-sampled, oversampled, or bootstrap-resampled to generate more catalogs and, potentially, a smoother distribution 404. An example of the use of down-sampling to produce a distribution is shown in FIGS. 12A-12B. FIG. 12A Shows an example joint distribution 1208 of the sample b value and it's bootstrap (e.g., using a Bayes' Theorem). This distribution can be shown as a joint PDF 1206. FIG. 12B shows the two marginal distributions from FIG. 12A. 1202 is the prior distribution of sample b values, generated by down-sampling one catalog into many smaller ones, and 1212 is the marginal distribution of all bootstrap samples. In this example, in plot 1202, one regional catalog of 3,361 events is down-sampled into 129 catalogs of 26 events with b value distribution 1204. They may be down-sampled to have the same number of earthquakes that have been observed at step 204 or are expected from the seismogenic index. Catalogs may also be probabilistically weighted using a logic tree FIG. 20 so that more relevant data are weighted higher. Next, the b value of each catalog can be calculated 406 using the method decided on in 302 and undertaken in steps 304 to 312. Each of the catalogs has an associated b value; it is the distribution of those b values that will be used 408. This b value distribution and the catalogs from 404 can be used as prior data in Bayesian inference 500 to generate an expected b value posterior 412; alternatively, 408 can be simply used as the forecast of b value 414. Either way, an expected future b value distribution will be needed for step 706.

Figure 5:
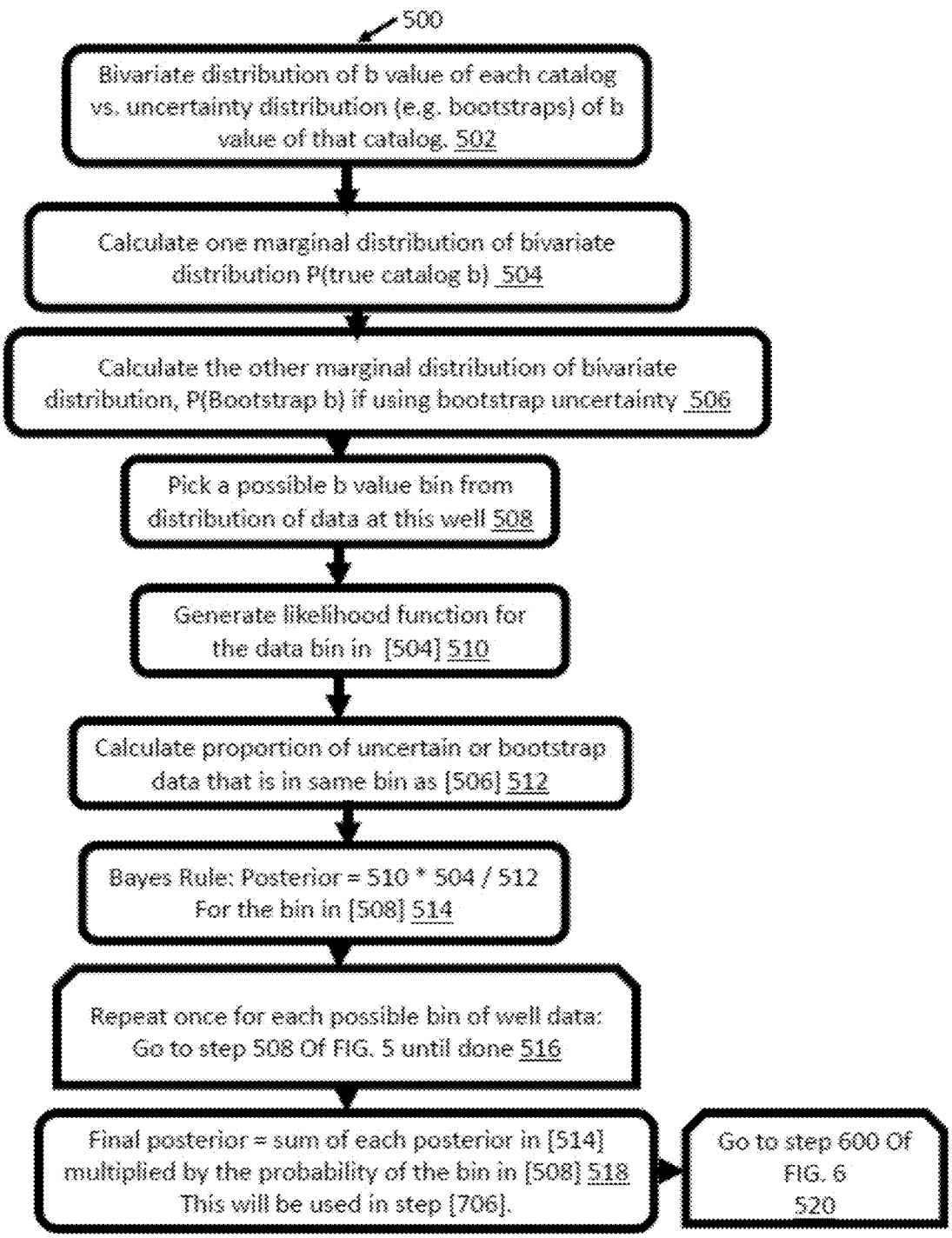
FIG. 5. Shows an example method of applying Bayesian Inference to b value distributions, according to some embodiments.

FIG. 5. shows the steps required to use Bayes' Theorem 500 to generate a final posterior b value distribution 518 from a bivariate distribution 502 and current data 310 or 312. More details on Bayes' Rule are presented in, for example, Stone, James V., Bayes Rule With MATLAB: a Tutorial Introduction to Bayesian Analysis, Sebtel press (2015), which is hereby incorporated by reference herein in its entirety. The marginal distributions of this bivariate distribution are calculated in steps 504 and 506 and shown as distributions 1204 and 1212, respectively.

Figure 13:
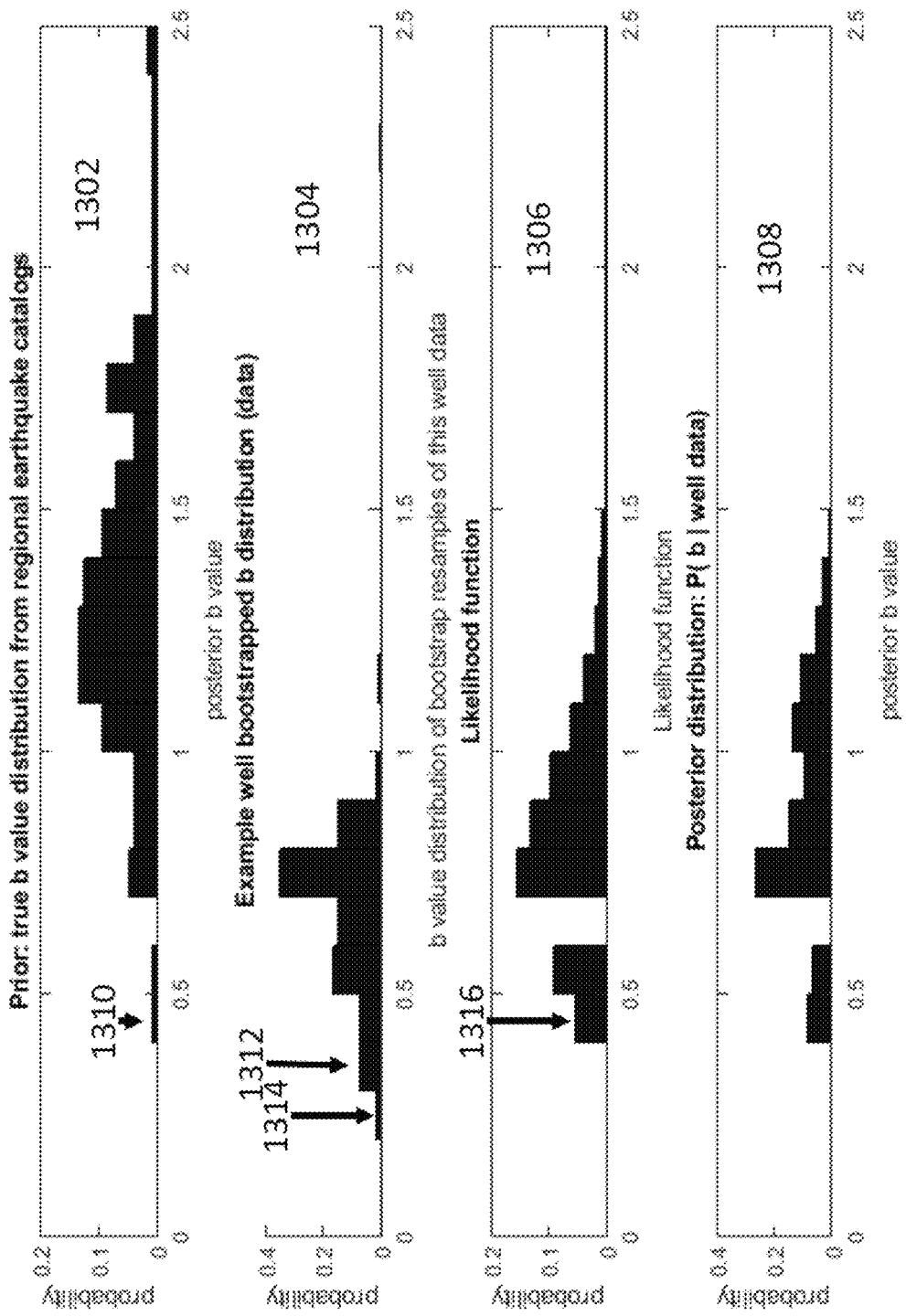
FIG. 13. Shows example b value distributions relevant to Bayesian inference, according to some embodiments.

An example of each distribution in the Bayes' calculation is shown in FIG. 13, where plot 1302 shows the prior distribution from 1204 and step 404. Plot 1304 shows the distribution of b values from bootstrap resamples of the magnitude bins, as shown in FIG. 11. These are the data observed for the current well case. Plot 1306 shows the likelihood function, which is the sum of likelihood functions for each bin in plot 1304 multiplied by the probability for that bin. For example, at step 508, first we pick bin 1314 and at step 510 calculate the likelihood function as if the data were entirely in bin 1312. Next, we use that likelihood function to calculate 512 the posterior using Bayes' rule at step 514. We then multiply the posterior distribution 514 by the probability of the bin 1314, which is about 2% at step 516. We then repeat this calculation from 508 for bin 1312, calculating the likelihood function, then the posterior, and then multiplying the posterior by the probability of bin 1312, which is about 8%. We add this result to the previous result at 516, and continue to the next bin at 508, building up a final posterior once we've gone over each bin in plot 1304. The final posterior from step 516 is plotted in 1308. This distribution represents the expectation of b value of future events and can be used at step 706.

Figure 6:
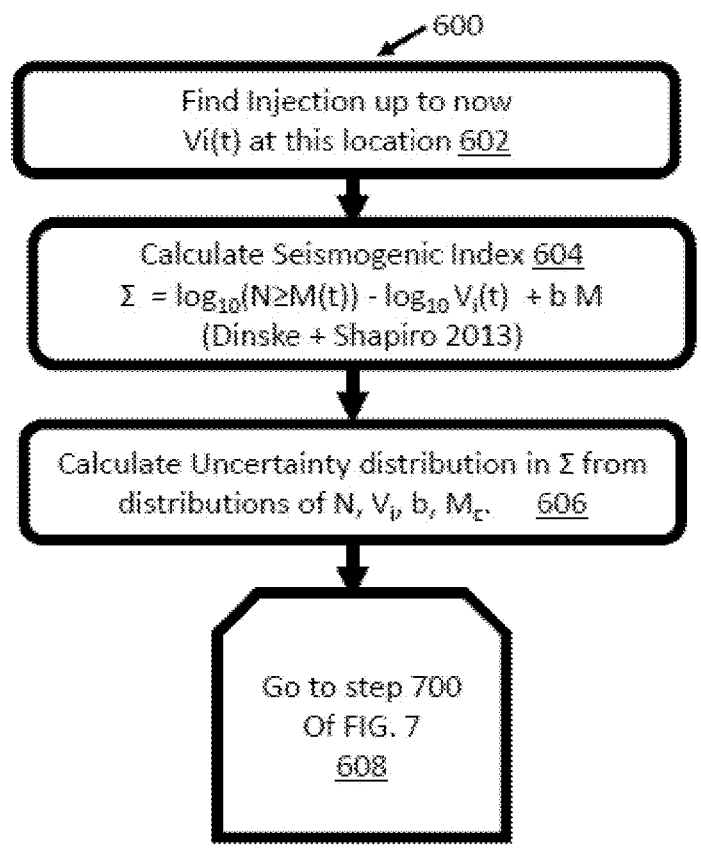
FIG. 6. Shows an example method for constraining a seismogenic index and determining the distribution of uncertainty within that seismogenic index, according to some embodiments.
Figure 7:
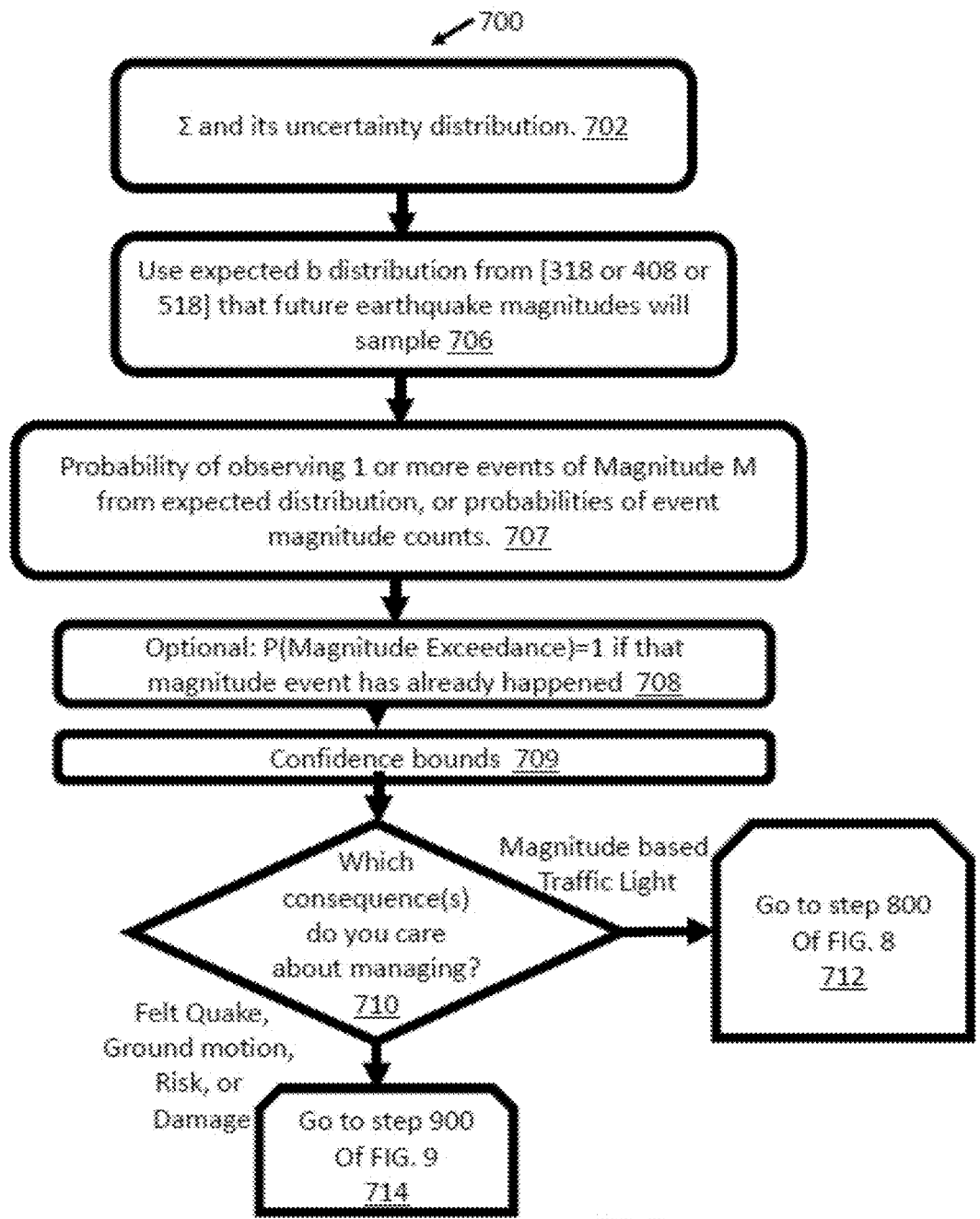
FIG. 7. Shows an example method for calculating the distribution of earthquakes and probability of observing earthquake magnitudes using a seismogenic index and a planned injection volume, according to some embodiments.

FIG. 6. Shows how to calculate a seismogenic index ($\Sigma$) and its uncertainty based on the uncertainties of the inputs. The seismogenic index for injection-induced seismicity relates injected volume (Vi) to the Gutenburg-Richter a value of associated earthquakes, and can be substituted into (1) as follows:

$$\log 10(N \geq M) = [\Sigma + \log 10 V_i] - bM \quad \text{(EQ. 2)}$$

The seismogenic index is different for each injection point 2126 because it characterizes the relation between injected fluid and seismicity at a given location. In some systems, the seismogenic index can be treated as an approximately constant parameter. It represents the hypotheses that the number of earthquakes is proportional to the fluid volume injection and that the magnitude of each earthquake represents a random sampling of the natural b value. Techniques and rationales for calculating the seismogenic index are disclosed in more detail in, for example, Dinske, C. and Shapiro, S., Seismotectonic State of Reservoirs Inferred from Magnitude Distributions of Fluid-Induced Seismicity, *Journal of Seismology* (2013) 17:13-25 DOI 10.1007/s10950-012-9292-9, which is hereby incorporated by reference herein in its entirety. It should also be noted that the seismogenic index is uncertain, and might thus be treated as such.

There are several ways to test the hypothesis that the earthquakes observed are NOT consistent with the seismogenic index model. For example, the number of earthquakes can be compared to the total injection volume to see if they are approximately proportional and the seismogenic index is approximately constant. In addition, the observed distribution of magnitudes can be compared to samples from a power law distribution. More details on these tests and the seismogenic index hypothesis are available in, for example, Van Der Elst, N. et al., Induced Earthquake Magnitudes are as Large as (Statistically) Expected, Journal of Geophysical Research: Solid Earth 121, 4575-4590, doi:10.1002/2016JB012818, which is hereby incorporated by reference herein in its entirety. Although $\Sigma$ can often be treated as approximately constant it may be uncertain and/or experience variability over the duration of injection 702. More details on $\Sigma$ can be found in, for example, Shapiro, S., Fluid Induced Seismicity, Cambridge University Press, (2015) ISBN: 9780521884570, p. 289, which is hereby incorporated by reference herein in its entirety. Adding uncertainty in $\Sigma$ may be of value, for example, because the number of future earthquakes is not certain or may not be exactly proportional to the volume injected.

Figure 14:
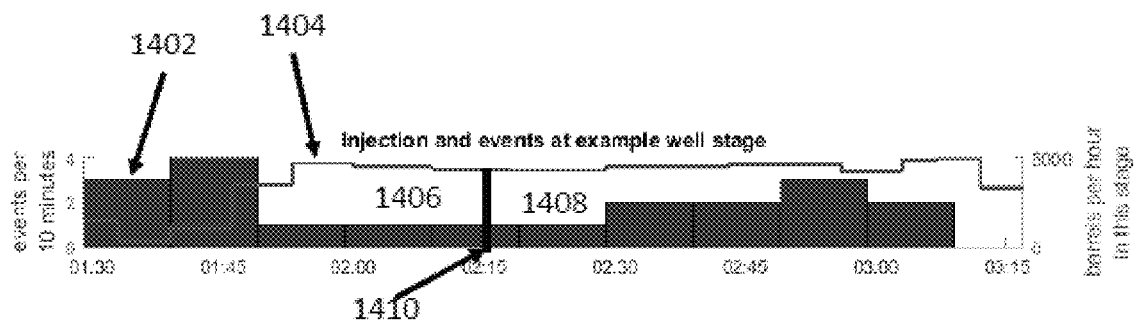
FIG. 14 shows an example case of a hydraulic fracturing injection stage during which earthquakes were recorded, according to some embodiments.

Earthquakes above the magnitude of completeness 1110 need to be recorded during injection (and are counted in 1402 in FIG. 14). Histogram 1402 shows the number of earthquakes above the magnitude of completeness 1110 recorded in each time interval during injection. Line 1404 shows the fluid injection rate over the duration of the stage. The area under the curve to the left of any given time represents the total fluid volume injected up to that time; the area under the curve to the right of that time represents the remaining fluid volume to be injected. In general, the remaining fluid volume is planned approximately in advance. However, it may be altered as the result of a risk assessment or protocol. Note that if the magnitude of completeness is uncertain, it can be treated probabilistically. The past injected volume is taken at 602, which is shown as 1406, the area under curve 1404 before some point in time of calculation 1410. Equation 2 can be rearranged to calculate $\Sigma$ for this injection point 604. At step 606, uncertainty in $\Sigma$ can be quantified using the uncertainty in each parameter used to calculate it. Once $\Sigma$ and b are constrained either deterministically or with some probabilistic distribution for an injection point 608, seismicity can be forecast starting at step 702.

The expected b value distribution for future earthquakes, needed at 706, is taken from either 318, 408, or 518. At step 707, the probability of at least one event exceeding magnitude M given injection Volume VI(t) at that location 2126 can be calculated as (e.g., as explained in Dinske and Shapiro 2017):

$$P=1-\exp(-VI(t) \cdot 10^{\Sigma - bM}) \qquad (EQ. 3)$$

Figure 15:
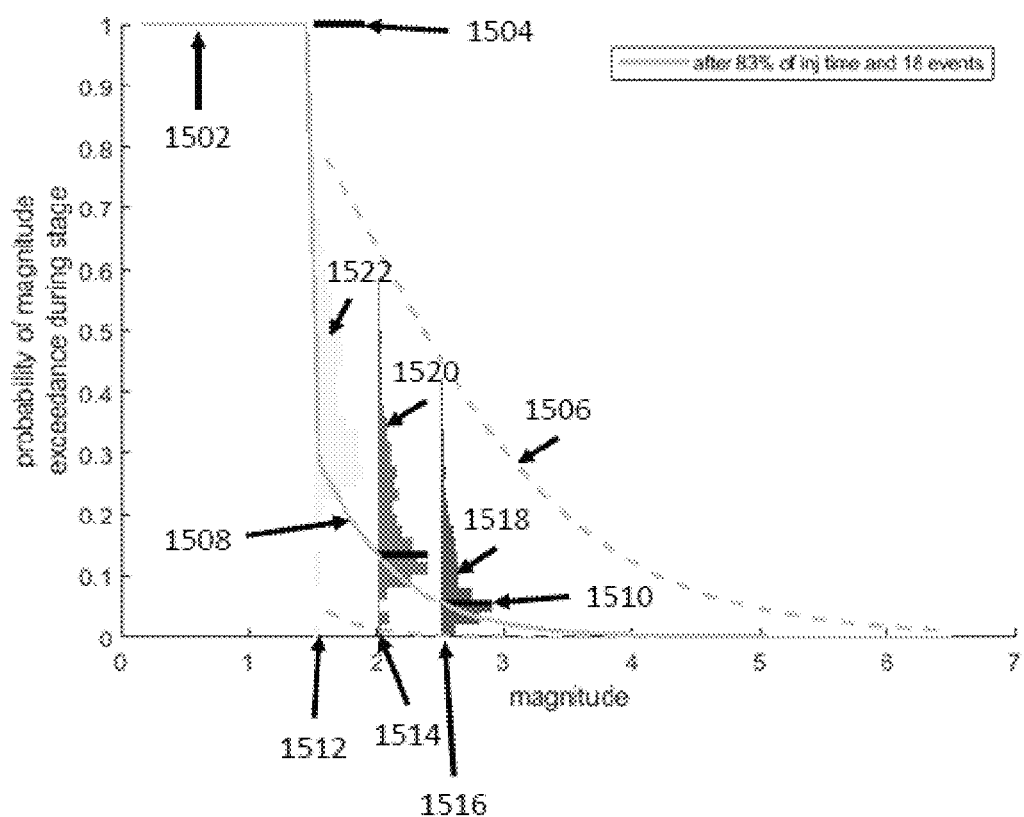
FIG. 15. Shows example results of the probability of magnitude exceedance calculation, its confidence bounds, and distributions of uncertainty at three magnitudes relevant to the traffic light system, according to some embodiments.

This calculation is plotted as line 1508 of FIG. 15, but is set to P=1 below magnitude 1.5 at step 708, because that magnitude has already been observed in the data. 95% confidence bounds are shown as dashed lines 1506.

Figure 8:
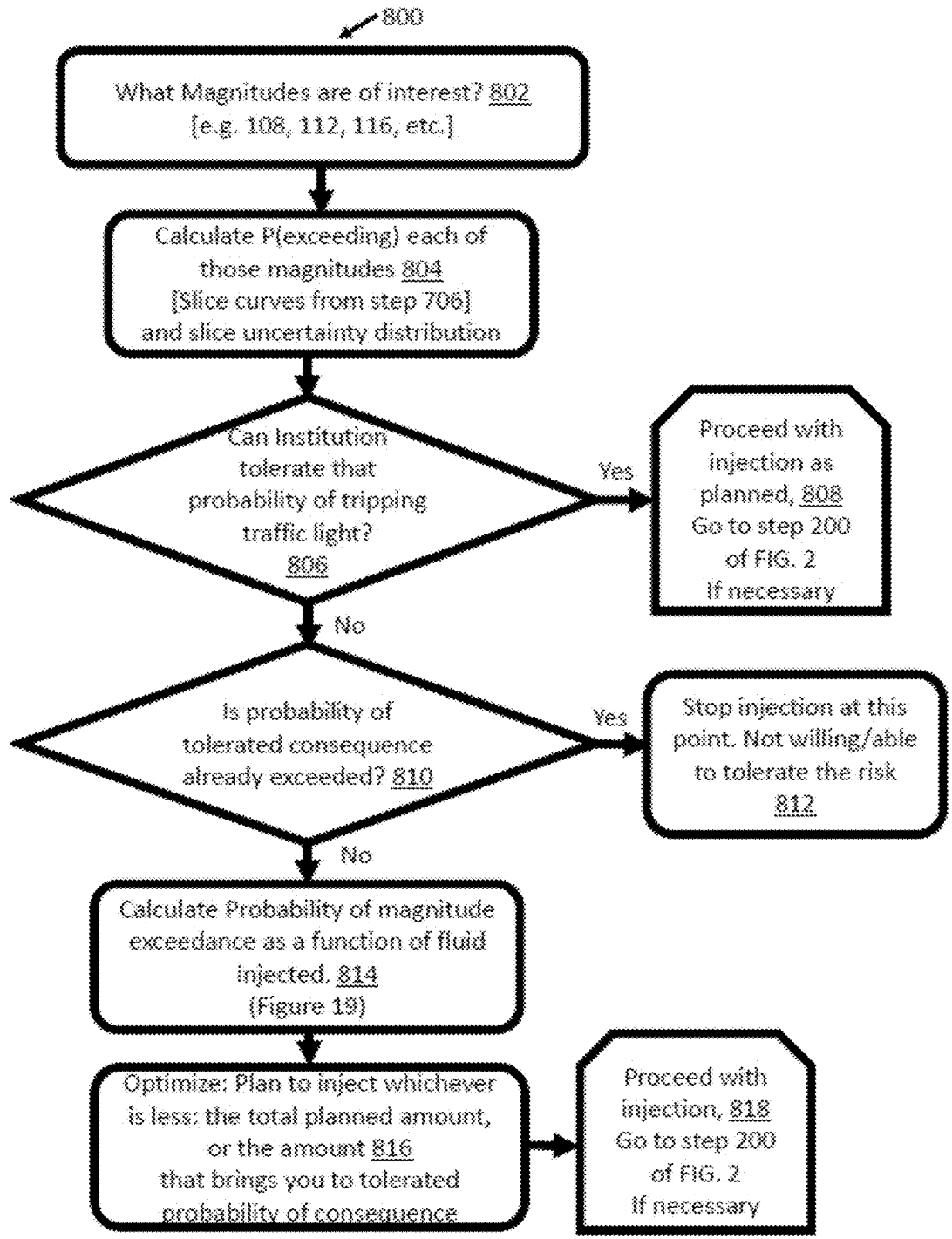
FIG. 8. Shows an example method of calculating the risk of exceeding a traffic light based on earthquake magnitude and of optimizing injection so it does not lead to exceedance of tolerable risk parameters, according to some embodiments.
Figure 9:
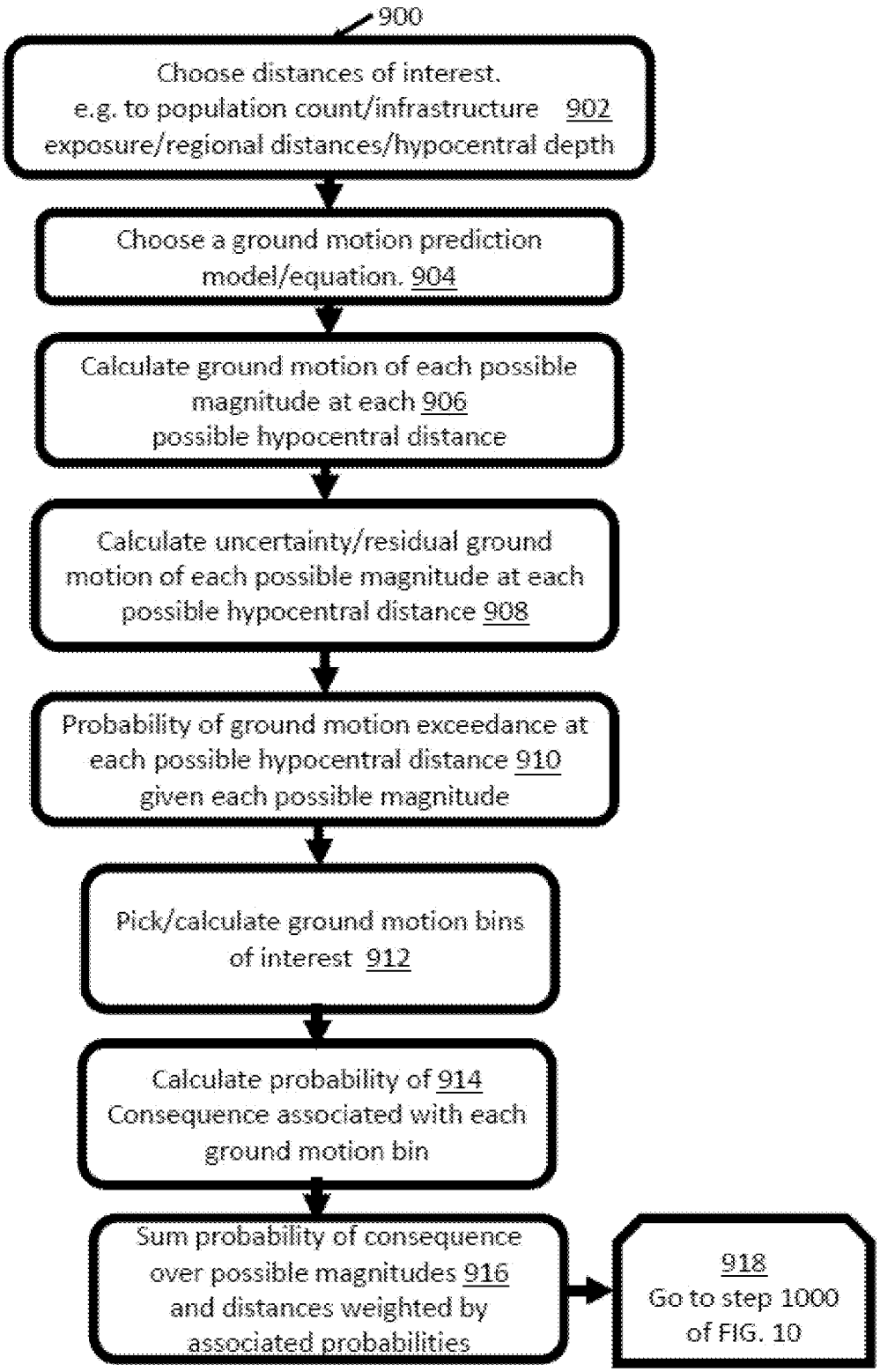
FIG. 9. Shows an example method of calculating the risk of people feeling induced shaking, according to some embodiments.
Figure 10:
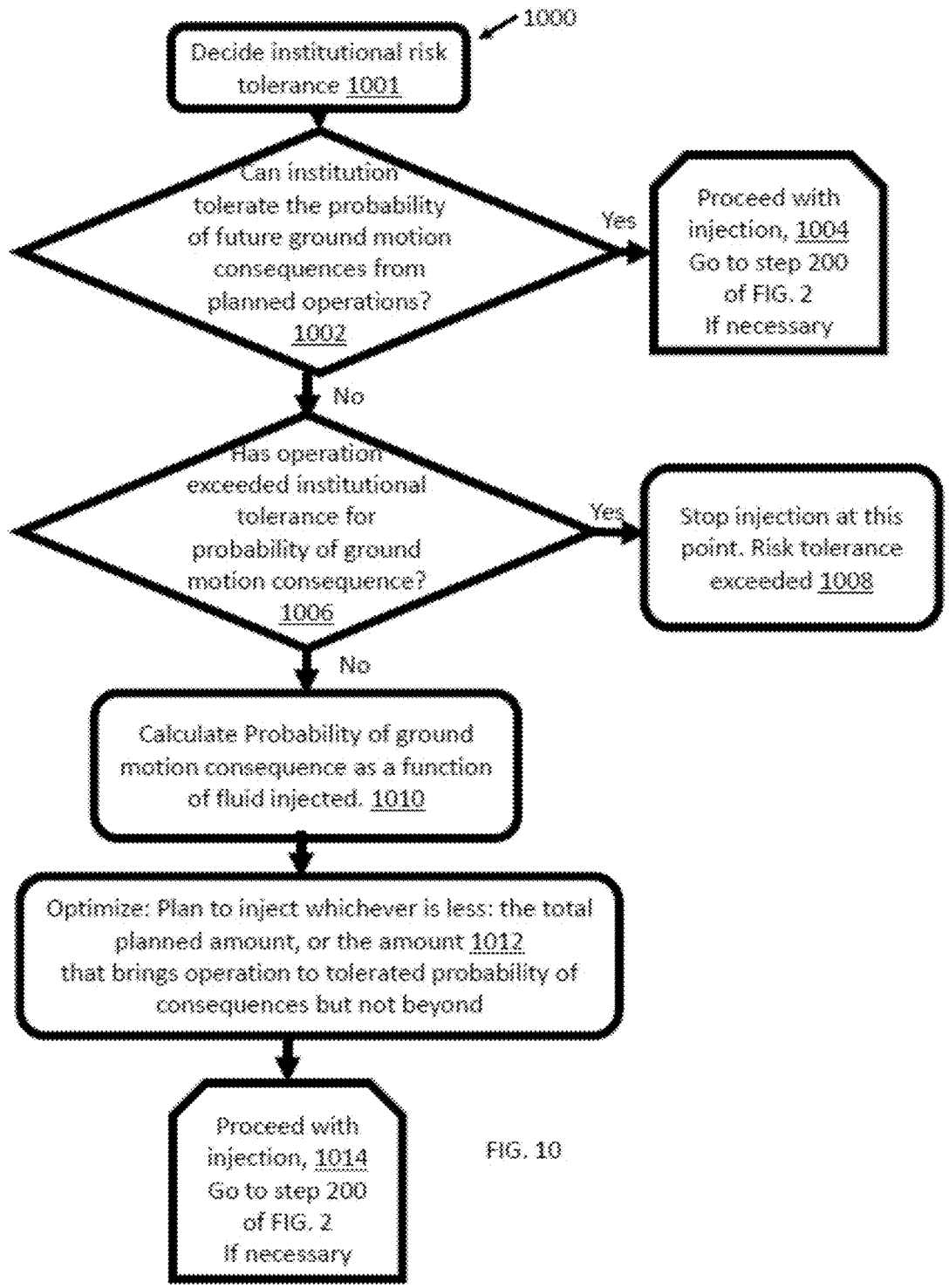
FIG. 10. Shows an example method of comparing risks to tolerance to establish whether operations should continue as is, continued under a modified plan, or stop, according to some embodiments.

One possible consequence of an induced earthquake of a given magnitude is a change in traffic light status (802, 1512, 1514, or 1516). FIG. 8 describes the steps to be taken when deciding whether to continue injection if a traffic light status has not been triggered, given a certain institutional tolerance to risk 806, 810. If tolerance is not exceeded 810, injection plans may be optimized for a given seismogenic index 816.

Figure 19:
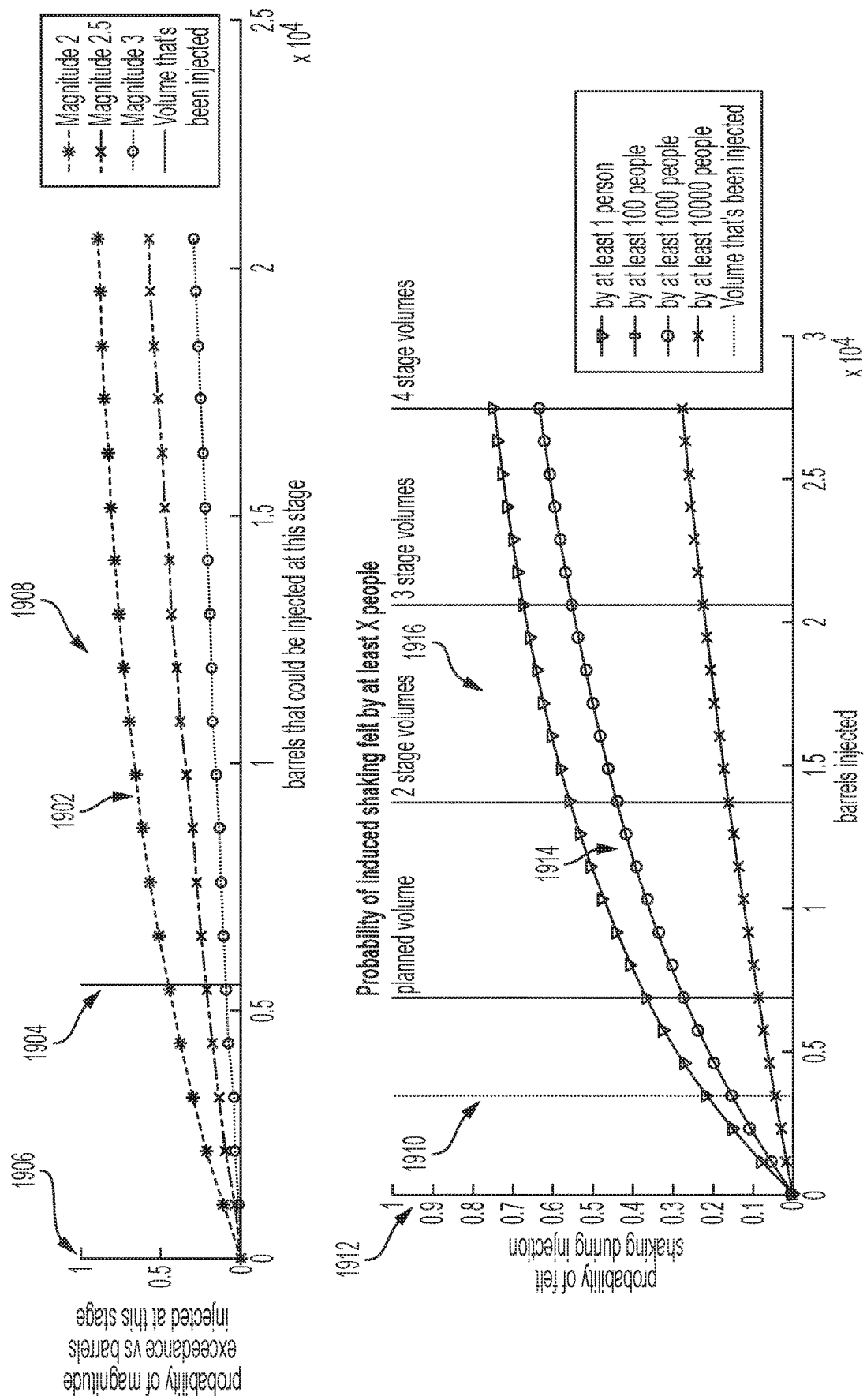
FIG. 19. Shows the probability of observing certain magnitude events as a function of the total injected fluid volume, according to some embodiments.

FIG. 19, plot 1908 shows the probability of exceeding a chosen magnitude as a function of fluid volume injected 814. For example, line 1902 shows the probability of inducing an event of magnitude 2 or larger. Line 1904 shows the volume that has been injected up to this point, which was used to constrain the seismogenic index at this injection location. An institution may choose to inject as much as desired until the probability of a consequence is intolerable 806.

An institution may decide its tolerance 1001 in several ways. For example, it might determine how many injections it plans to undertake in a year and how many times in that year it could tolerate each consequence. It may also assign a dollar or value benefit function to the injection volume and a dollar value or penalty function to each consequence. Plots similar to 1908 may be made for other consequences. For example, plot 1916 makes the vertical axis 1912 the probability of shaking being felt by a given number of people. Line 1914 shows the probability of at least 1,000 people feeling induced shaking, as an example of step 1010. Like 1904, 1910 shows the volume that was injected at the time the model was constrained.

Figure 16:
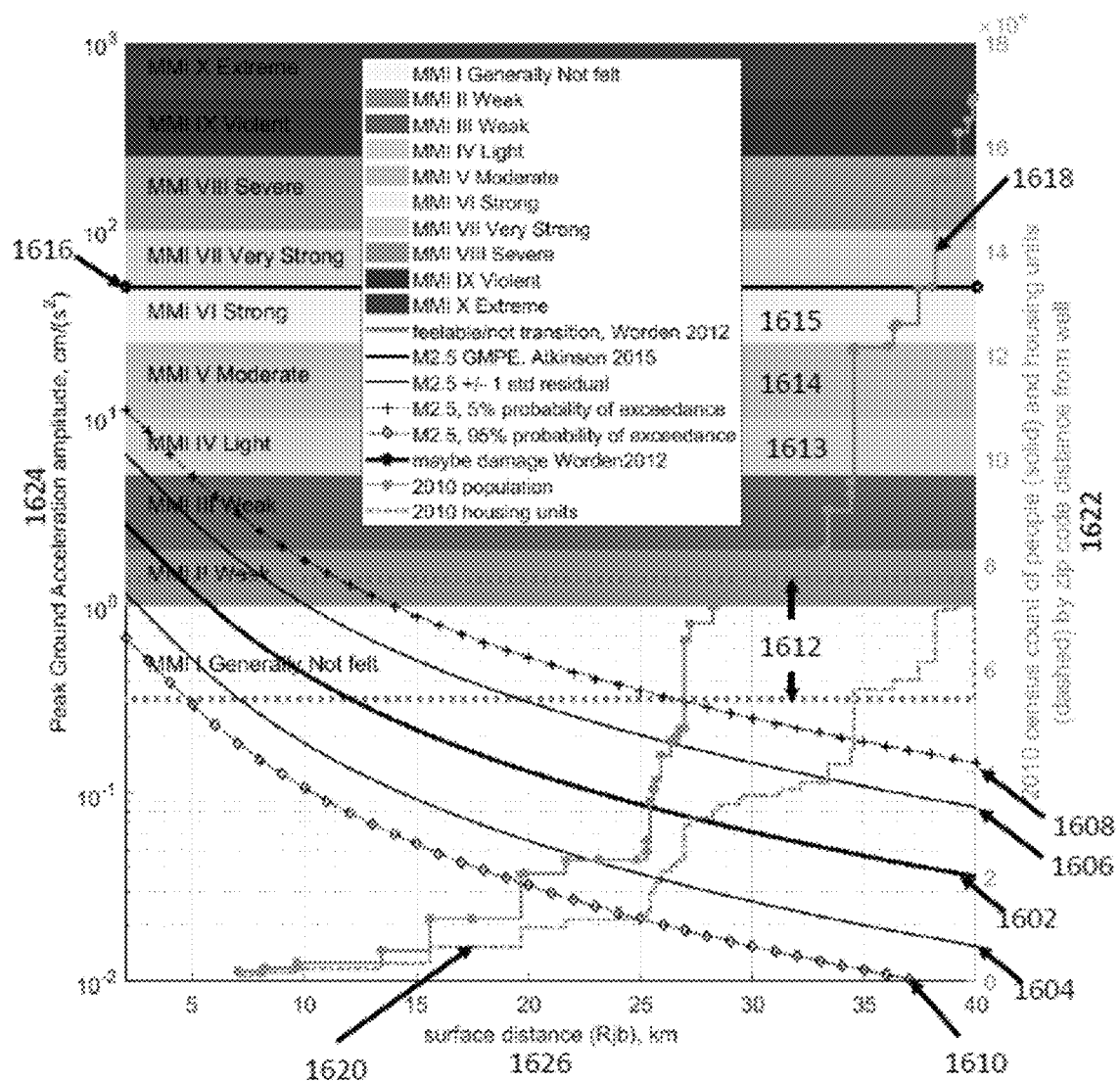
FIG. 16. Shows a plot of ground motion, residual, and population exposure vs. distance, according to some embodiments.

In addition to assessing the probability of exceeding a traffic light threshold, a decision may be made 710 to assess other consequences. If risk, infrastructure damage, or felt seismicity are of interest, 714 step 900 begins an assessment of these consequences. In these cases, a range of distances 1626 to exposure should be assessed 902. Given an event magnitude, a ground motion prediction equation (GMPE, such as that of, for example, Atkinson, Gail, 2015, Ground-Motion Prediction Equation for Small-to-Moderate Events at Short Hypocentral Distances, with Application to Induced-Seismicity Hazards, *Bulletin of the Seismological Society of America* V. 105, No. 2A, pp 981-992, which is used in this example 1602 and which is hereby incorporated by reference herein in its entirety) or a model of ground motion can be used to calculate a curve relating intensity to distance 904. This quantifies the potential for ground shaking at a distance, and can be repeated for each potential distance and magnitude 906. Note that more than one distance metric can be employed, including the Joyner-Boore distance (distance along the Earth's surface) or hypocentral distance. Uncertainty should also be calculated 908. FIG. 16 demonstrates the Atkinson 2015 GMPE for a magnitude 2.5 event at 3 km depth 1602. FIG. 16 also shows curves showing the expected value as well as +/−1 standard deviation 1604, 1606, step 908, and the 5% and 95% probabilities of exceedance 1608, 1610, step 910. These are based on normally distributed residuals. FIG. 16 It also relates Peak Ground Acceleration (PGA) to the Modified Mercalli Intensity scale and shows the cumulative number of people living within each distance of an example well location. In particular, PGA is chosen as the ground motion intensity metric 1624, but the other metrics introduced above could also be used. Different bins e.g. 1613, 1614, 1615, show modified Mercalli intensities, and the bin shown as 1612 shows the range of smallest ground motion that can be felt, for example, as derived from Worden C. et al. (2012), Probabilistic Relationships between Ground-Motion Parameters and Modified Mercalli Intensity in California *Bulletin of the Seismological Society of America*, Vol. 102, No. 1, pp. 204-221, February 2012, doi: 10.1785/0120110156, which is hereby incorporated by reference herein in its entirety. Also shown in FIG. 16 on the right axis 1622 is the cumulative number of people 1618 and the cumulative number of housing units 1620 within each distance 1626 of the well. These data come from the US Census and can be used to choose which distances are of interest and assess how many people might feel a ground motion based on the distance. The data are used in the calculation in plot 1916 of FIG. 19. Other exposure or population data describing the distribution of housing 1620 or other infrastructure might also be incorporated.

One example of a risk calculation criteria is the evaluation of whether an earthquake large enough to be felt might occur. In FIG. 17, Modified Mercalli Intensity (MMI) shaking [1709, 1710, 1712, 1714, 1716, 1718, 1720, 1722, 1724, 1726] values are plotted as bars based on the Peak Ground Acceleration range they represent; these are examples of ground motions of interest 912. The figure includes a verbal description of each MMI as well as an estimate of the probability of that shaking intensity being felt (e.g. 1728, determined by calculation or estimation at step 914). 1704 is a plot of the probability of a PGA being felt by a person based on the descriptions of the Modified Mercalli Intensity. This plot is poorly constrained, and may vary by person, location, and time of day or other conditions. In this case, line 1704 was chosen by a user.

Line 1702 shows an example of a probability of PGA exceedance curve for a Magnitude 3 earthquake at 3 km depth and 10 km Joyner-Boore distance. The probability of the event being felt at this distance can be calculated 914. For example, 1706 shows that there is a 45% chance of exceeding the PGA representing the lower bound of MMI III. Point 1708 shows that there is an 8% chance of exceeding the PGA at the upper bound of MMI III. Therefore, there is a 37% chance that the PGA experienced is within MMI III at this location. If MMI III is experienced, curve 1704 shows that there is a 45% chance of it being felt by a person at that location, so this intensity contributes 16.6% to the probability that the earthquake is felt. Summing over all possible MMIs at step 916 results in the probability that the shaking at this distance is felt.

Figure 18:
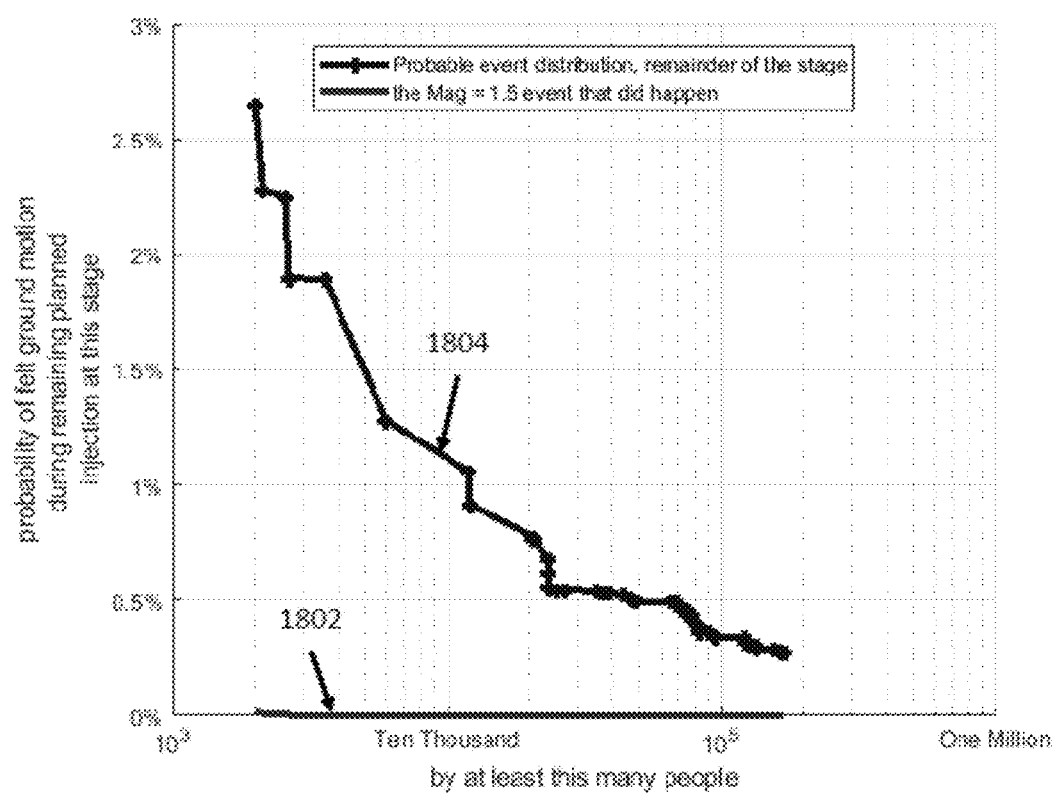
FIG. 18. Shows example curves representing the probability of at least a given number of people feeling ground motion, according to some embodiments.

FIG. 18 line 1802 shows an example of the calculated probability that an earthquake will be felt over a range of distances; note that the horizontal axis of FIG. 18 does not show distance per se, but rather shows the cumulative number of people within a certain distance as the radius around the well expands. Line 1802 represents one earthquake that did happen, so the probability of it happening was 100%. Line 1804 shows the same calculation, but summed over many earthquake magnitudes for earthquakes that haven't occurred, each weighted by its probability of occurring over the remainder of a planned injection. This probability comes from the derivative of the tail curve in 1508 above magnitude 1512. Note that it is generally uncertain which magnitude to use as the maximum possible magnitude; this problem could be treated in many probabilistic manners, including with a logic tree FIG. 20.

Figure 20:
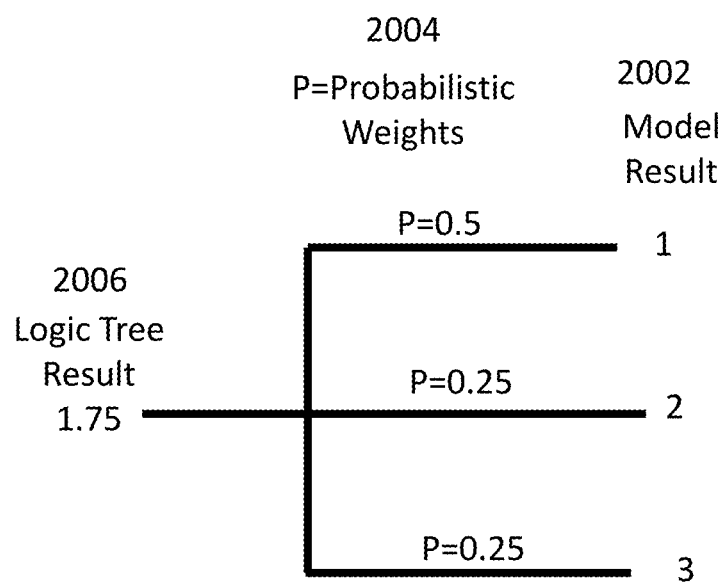
FIG. 20. Shows an example logic tree that can be used to weight various model results, according to some embodiments.

As demonstrated in FIG. 20, logic trees can be used to probabilistically weight the outcomes of different model calculations. Logic trees are employed in, for example, Petersen et al. (2016) Seismic-hazard forecast for 2016 including induced and natural earthquakes in the central and eastern United States Seismological Research Letters Vol. 87, I. 6 (2013) pp. 1327-1341. doi: 10.1785/0220160072, which is hereby incorporated by reference herein in its entirety. Logic trees are used to weight different calculation results 2002 based on their associated probabilities 2004 to produce a combined model result 2006. This strategy can be applied separately to several parts of this model, including treatment of the maximum magnitude possible, the magnitude of completeness, or the weighting of different prior earthquake catalogs among other uncertainties.

Bootstrap, Jack Knife, Monte Carlo, and similar methods of randomly sampling uncertain input parameters such as event locations or magnitudes of completeness may be combined with many of the above steps.

These calculations may be encompassed in a computer program featuring a graphical user interface, dashboard, or app which can throw a warning if a tolerance is exceeded. The warning may also be accompanied by suggested alternative injection plans.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball) or touch screen, by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the accompanying description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computerized method of processing earthquake magnitude and fluid injection data, comprising:
   receiving data indicative of earthquake magnitudes associated with a set of fluid injection rates of fluid into one or more wells at a location;
   calculating a magnitude distribution value and an uncertainty of the distribution value based on the received earthquake data, wherein the distribution value represents a proportion of each magnitude earthquake observed;
   calculating a seismogenic index based on an injected volume from the set of fluid injection rates, the distribution value, and an earthquake count from the received earthquake data, wherein the seismogenic index represents a number of earthquakes per volume of fluid injected into the earth at the one or more wells at the location;
   generating a distribution value expectation based on previously determined seismicity, wherein the distribution value represents a distribution of magnitudes that may be observed for the previously determined seismicity;
   generating, based on the distribution value, an expected distribution of future earthquake magnitude observations;
   forecasting a number of earthquakes that will be induced of each magnitude based on the seismogenic index and the expected distribution of future earthquake magnitude observations; and
   calculating, based on the forecasted number of earthquakes that will be induced for each magnitude, a ground motion prediction model that represents shaking intensity at distance from the one or more wells at the location.

2. The method of claim 1, wherein calculating the distribution value comprises calculating a Gutenburg-Richter b value.

3. The method of claim 1,
   wherein calculating the distribution value comprises calculating a Gutenburg-Richter a value and a Gutenburg-Richter b value; and
   the method further comprises:
      applying a Bayes Theorem to uncertainty in the Gutenburg-Richter b value, the Gutenburg-Richter a value, or both.

4. The method of claim 1, further comprising:
   receiving new earthquake data, fluid injection data, or both, generated during fluid injection; and
   updating the forecasted induced event population based on the new earthquake data, fluid injection data, or both.

5. The method of claim 1, further comprising applying the forecasted distribution to evaluate a chance of violating a traffic light based constraint, wherein the traffic light based constraint comprises an earthquake magnitude.

6. The method of claim 1, further comprising:
   executing a fragility function representing a susceptibility of structures to damage by shaking;
   calculating, based on historical earthquake data, a probabilistic description representative of how people would perceive ground motion; or both.

7. The method of claim 1, further comprising assigning a penalty value to a consequence, wherein the penalty comprises one or more of a point, score, dollar amount, or any combination thereof, to quantify a tolerance of an institution for inducing ground shaking.

8. The method of claim 1, further comprising:
   executing a calculation to account for uncertainties in a model parameter; wherein:
      the calculation is selected from the group consisting of Probabilistic, Monte Carlo, Quantitative Risk Analysis, Sensitivity analysis, or a Bootstrap process; and
      the model parameter is selected from the group consisting of uncertainties in locations of future induced events, b values, a values, expected number of events, ground motion from events, felt sensitivities, and probability of an event being a false detection.

9. The method of claim 1, further comprising determining a set of maximized injection parameters based on a forecast of seismicity, shaking, or both, to determine a tolerated amount of injection based on a probabilistic seismicity constraint.

10. The method of claim 1, further comprising probabilistically weighting results of different models using a logic tree.

11. The method of claim 1, wherein generating the expected distribution of future earthquake magnitude observations comprises generating the expected distribution based on the distribution value and Bayes theorem.

12. An apparatus configured to process earthquake magnitude and fluid injection data, the apparatus comprising a processor in communication with memory, the processor being configured to execute instructions stored in the memory that cause the processor to perform:
   receiving data indicative of earthquake magnitudes associated with a set of fluid injection rates of fluid into one or more wells at a location;
   calculating a magnitude distribution value and an uncertainty of the distribution value based on the received earthquake data, wherein the distribution value represents a proportion of each magnitude earthquake observed;
   calculating a seismogenic index based on an injected volume from the set of fluid injection rates, the distribution value, and an earthquake count from the received earthquake data, wherein the seismogenic index represents a number of earthquakes per volume of fluid injected into the earth at the one or more wells at the location;
   generating a distribution value expectation based on previously determined seismicity, wherein the distribution value represents a distribution of magnitudes that may be observed for the previously determined seismicity;

generating, based on the distribution value, an expected distribution of future earthquake magnitude observations;

forecasting a number of earthquakes that will be induced of each magnitude based on the seismogenic index and the expected distribution of future earthquake magnitude observations; and calculating, based on the forecasted number of earthquakes that will be induced for each magnitude, a ground motion prediction model that represents shaking intensity at distance from the one or more wells at the location.

13. A non-transitory computer-readable media comprising instructions that, when executed by one or more processors on a computing device, are operable to cause the one or more processors to process earthquake magnitude and fluid injection data, comprising:

receiving data indicative of earthquake magnitudes associated with a set of fluid injection rates of fluid into one or more wells at a location;

calculating a magnitude distribution value and an uncertainty of the distribution value based on the received earthquake data, wherein the distribution value represents a proportion of each magnitude earthquake observed;

calculating a seismogenic index based on an injected volume from the set of fluid injection rates, the distribution value, and an earthquake count from the received earthquake data, wherein the seismogenic index represents a number of earthquakes per volume of fluid injected into the earth at the one or more wells at the location;

generating a distribution value expectation based on previously determined seismicity, wherein the distribution value represents a distribution of magnitudes that may be observed for the previously determined seismicity;

generating, based on the distribution value, an expected distribution of future earthquake magnitude observations;

forecasting a number of earthquakes that will be induced of each magnitude based on the seismogenic index and the expected distribution of future earthquake magnitude observations; and calculating, based on the forecasted number of earthquakes that will be induced for each magnitude, a ground motion prediction model that represents shaking intensity at distance from the one or more wells at the location.

* * * * *